(12) United States Patent
Satou et al.

(10) Patent No.: US 11,522,242 B2
(45) Date of Patent: Dec. 6, 2022

(54) BATTERY PACK

(71) Applicant: NISSAN MOTOR CO., LTD., Yokohama (JP)

(72) Inventors: Hajime Satou, Kanagawa (JP); Yasuhiko Ohsawa, Kanagawa (JP); Yuki Kusachi, Kanagawa (JP); Hiroshi Akama, Kanagawa (JP); Hideaki Horie, Kanagawa (JP); Yusuke Mizuno, Kyoto (JP); Yusuke Emori, Kyoto (JP); Takahiro Imaishi, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/082,729

(22) PCT Filed: Mar. 8, 2017

(86) PCT No.: PCT/JP2017/009325
§ 371 (c)(1),
(2) Date: Sep. 6, 2018

(87) PCT Pub. No.: WO2017/154999
PCT Pub. Date: Sep. 14, 2017

(65) Prior Publication Data
US 2019/0355940 A1 Nov. 21, 2019

(30) Foreign Application Priority Data

Mar. 10, 2016 (JP) .............................. JP2016-047609
Mar. 8, 2017 (JP) .............................. JP2017-043578

(51) Int. Cl.
*H01M 6/46* (2006.01)
*H01M 10/625* (2014.01)
(Continued)

(52) U.S. Cl.
CPC ......... *H01M 50/10* (2021.01); *H01M 50/147* (2021.01); *H01M 50/172* (2021.01); *H01M 2200/20* (2013.01)

(58) Field of Classification Search
None
See application file for complete search history.

(56) References Cited

U.S. PATENT DOCUMENTS 5,912,090 A * 6/1999 Nagai ................. H01M 2/0275
429/131
9,203,073 B2 12/2015 Obika et al.
(Continued)

FOREIGN PATENT DOCUMENTS

CN 102656715 A 9/2012
CN 102959785 A 3/2013
(Continued)

*Primary Examiner* — Cynthia H Kelly
*Assistant Examiner* — Julian Anthony
(74) *Attorney, Agent, or Firm* — Foley & Lardner LLP

(57) ABSTRACT

The battery pack has a laminated body in which unit cells are laminated one on another, a cell case having a first opening and containing the laminated body, and a first lid member to tightly close the first opening. The first opening is positioned to face, in connection with a unit cell laminated direction, a first face of the laminated body. The first lid member is configured to, if an internal pressure of the cell case is lower than atmospheric pressure, deform while keeping the tightly closing state, come into contact with the first face of the laminated body, and apply a pressure based on a differential pressure between atmospheric pressure and the internal pressure of the cell case to the contacting face.

21 Claims, 16 Drawing Sheets

(51) Int. Cl.
*H01M 50/238* (2021.01)
*H01M 50/10* (2021.01)
*H01M 50/147* (2021.01)
*H01M 50/172* (2021.01)

(56) References Cited

U.S. PATENT DOCUMENTS

| | | | |
|---|---|---|---|
| 9,299,973 B2 | 3/2016 | Kinoshita et al. | |
| 9,812,686 B2 | 11/2017 | Kako et al. | |
| 2006/0051666 A1* | 3/2006 | Kim | H01M 2/0207 429/184 |
| 2009/0023059 A1 | 1/2009 | Kinoshita et al. | |
| 2009/0053585 A1* | 2/2009 | Nakazawa | H01M 2/1077 429/56 |
| 2011/0171525 A1* | 7/2011 | Abe | H01M 4/623 429/212 |
| 2011/0311862 A1* | 12/2011 | Ahn | H01M 2/021 429/179 |
| 2012/0107673 A1 | 5/2012 | Sakashita et al. | |
| 2012/0321919 A1 | 12/2012 | Schaefer et al. | |
| 2013/0122333 A1 | 5/2013 | Obika et al. | |
| 2013/0130079 A1 | 5/2013 | Kako et al. | |
| 2014/0356651 A1 | 12/2014 | Ciaccio | |
| 2015/0243938 A1 | 8/2015 | Kim et al. | |
| 2016/0028050 A1 | 1/2016 | Shiraishi | |
| 2017/0033350 A1 | 2/2017 | Mizuno et al. | |
| 2018/0301691 A1 | 10/2018 | Mizuno et al. | |

FOREIGN PATENT DOCUMENTS

| | | |
|---|---|---|
| JP | 2007-242593 A | 9/2007 |
| JP | 2012-114066 A | 6/2012 |
| JP | 2013-045555 A | 3/2013 |
| JP | 2015-527723 A | 9/2015 |
| KR | 20120120188 A | 11/2012 |
| KR | 20130041231 A | 4/2013 |
| WO | WO 2014/141779 A1 | 9/2014 |
| WO | WO-2015/093411 A1 | 3/2017 |

* cited by examiner

BATTERY PACK

TECHNICAL FIELD

The present invention relates to a battery pack.

BACKGROUND ART

In recent years, it is strongly required, for environmental protection, to reduce carbon dioxide emissions. The automobile industry is concentrating in introducing electric cars and hybrid electric cars to anticipate reducing carbon dioxide emissions. To extend a cruising distance, there has been proposed a battery pack having a laminated body in which unit cells are laminated together (for example, refer to Patent Literature 1).

CITATION LIST

Patent Literature

Patent Literature 1: United States Patent Application Publication No. 2014/0356651

SUMMARY OF INVENTION

Problems to be Solved by Invention

However, it is necessary, for reducing internal resistance among the unit cells, to apply a proper pressing pressure (tightening force) to the laminated body. When enlarging a unit cell (electrode) area, there will be a problem of necessitating a massive pressurizing unit that is hardly installable on a vehicle. For example, a pressing pressure of 0.5 atmospheres on an electrode of 50 cm×100 cm will be 2500 kg in total.

The present invention has been made to solve the problems concerning the above-mentioned related art and intends to provide a battery pack capable of, even if an electrode area is large, easily applying a proper pressing pressure to a laminated body in which unit cells are laminated one on another.

Means to Solve Problems

To accomplish the above-mentioned object, a battery pack according to the present invention includes a laminated body in which unit cells are laminated one on another, a cell case having a first opening and containing the laminated body, and a first lid member to tightly close the first opening. The first opening is positioned to face a first face of the laminated body in terms of a laminated direction of the unit cells. The first lid member is deformable while tightly closing the first opening and is positioned so that, if an internal pressure of the cell case is equal to an external pressure of the cell case, the first lid member is spaced apart from the first face of the laminated body. If the internal pressure of the cell case is lower than the external pressure of the cell case, the first lid member is configured to deform, come into contact with the first face of the laminated body, and apply a pressure based on a differential pressure between the internal pressure of the cell case and the external pressure of the cell case to the contacting face.

MODE OF IMPLEMENTING INVENTION

Figure 1:
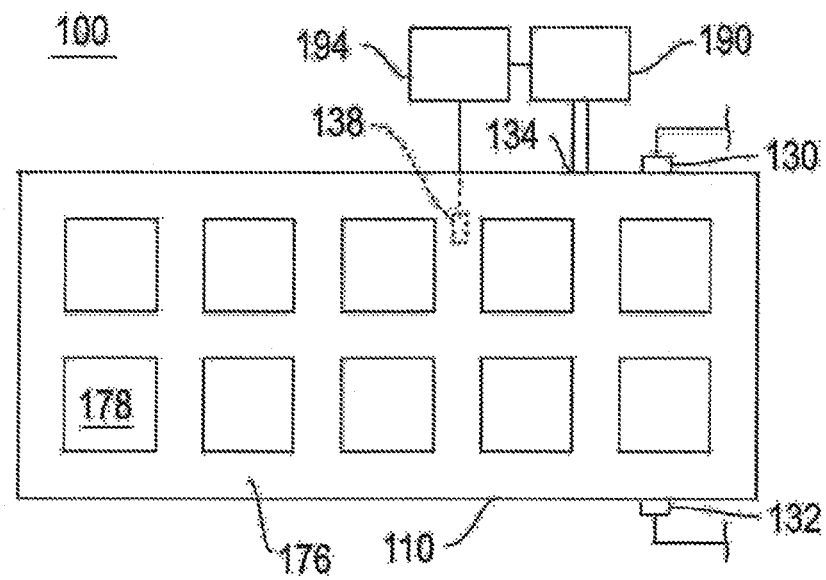
FIG. 1 is a schematic view illustrating a battery pack according to Embodiment 1.

With reference to the drawings, embodiments of the present invention will be explained. In the drawings, thickness ratios are exaggerated for the sake of explanation and may differ from actual ratios.

Figure 2:
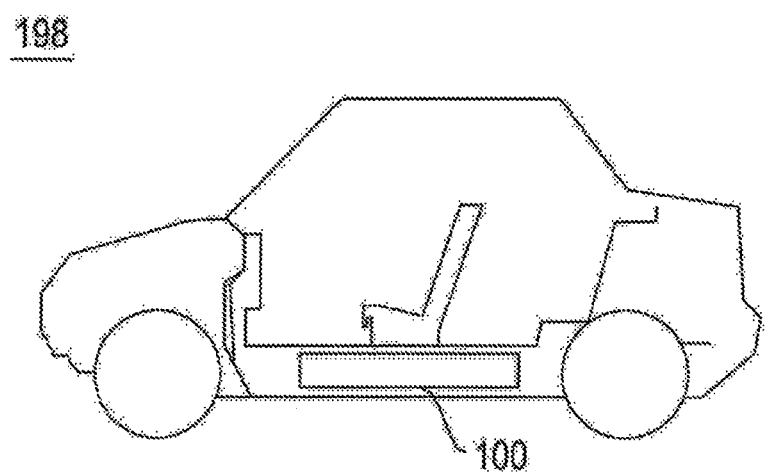
FIG. 2 is a schematic view illustrating a usage of the battery pack.
Figure 3:
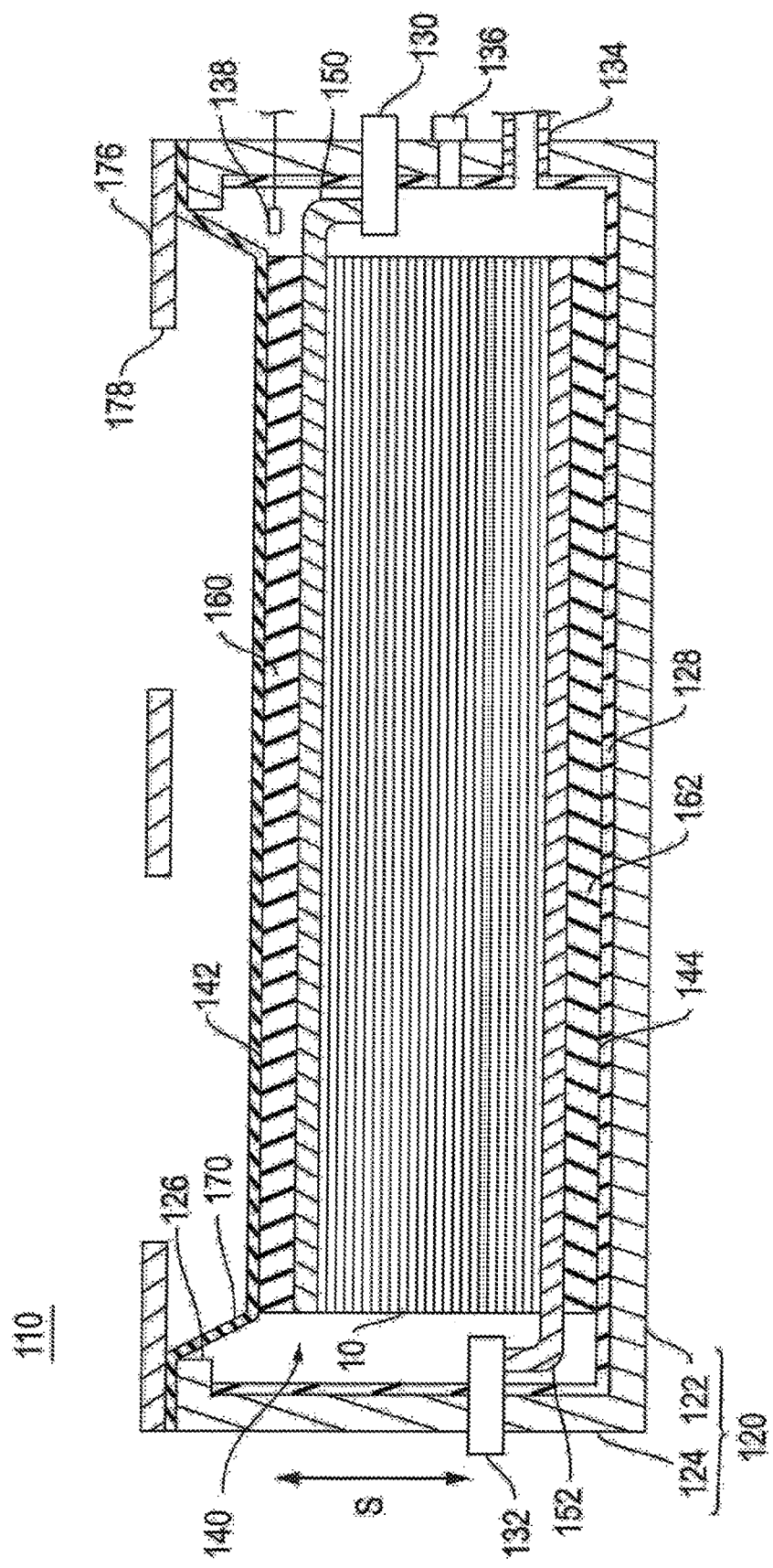
FIG. 3 is a sectional view illustrating a main body unit illustrated in FIG. 1.
Figure 4:
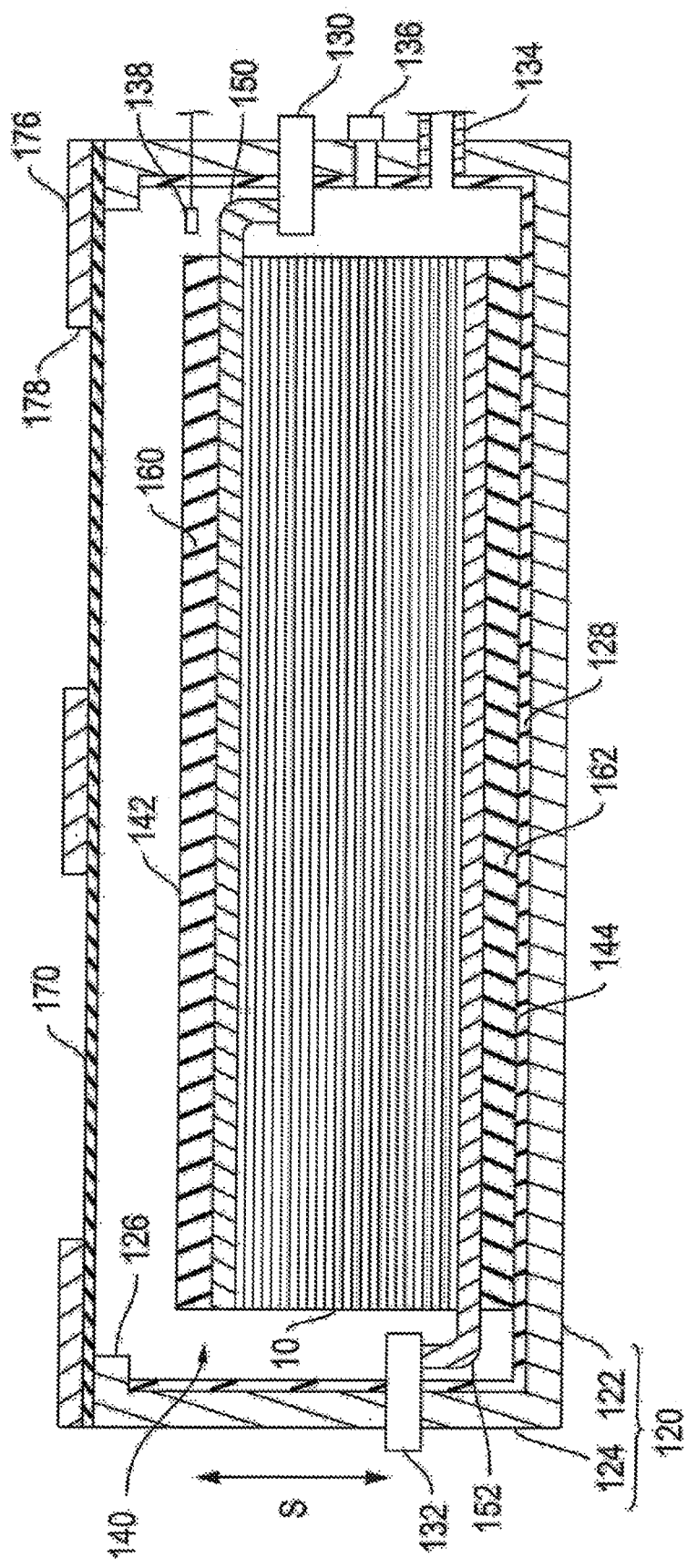
FIG. 4 is a sectional view illustrating a shape before decompression of a first lid member illustrated in FIG. 3.

FIG. 1 is a schematic view illustrating a battery pack according to Embodiment 1, FIG. 2 is a schematic view illustrating a usage of the battery pack, FIG. 3 is a sectional view illustrating a main body unit illustrated in FIG. 1, and FIG. 4 is a sectional view illustrating a shape before decompression of a first lid member illustrated in FIG. 3.

The battery pack 100 according to the Embodiment 1 is applied to, for example, a power source of a vehicle 198 illustrated in FIG. 2, and as illustrated in FIGS. 1 and 3, has a main body unit 110, a decompressor 190, and a control unit 194. The vehicle 198 is, for example, an electric car or a hybrid electric car. The battery pack 100 easily realizes, as will be explained later, a high energy density, and therefore, is able to extend a cruising distance per charge.

The main body unit 110 includes a cell case 120 made of a rigid material, a first lid member 170 made of a flexible material, and a first cover plate 176. In this specification, the "cell case 120 made of a rigid material" means that the cell case 120 is rigid and not easily deformed when external force is applied thereto, thereby sufficiently protecting a laminated body 140 arranged therein. The "first lid member 170 made of a flexible material" means that the first lid member 170 has flexibility to an extent that a differential pressure produced between an external pressure and an internal pressure of the cell case 120 by decompressing the inside of the cell case 120 (decreasing the internal pressure of the cell case 120 lower than the external pressure (at least atmospheric pressure)) may deform the first lid member 170. Similarly, a second lid member to be explained later, i.e., the "second lid member 173 made of a flexible material" means that the second lid member 173 has flexibility to an extent that a differential pressure produced between an external pressure and an internal pressure of the cell case 120 by decompressing the inside of the cell case 120 (decreasing the internal pressure of the cell case 120 lower than the external pressure (at least atmospheric pressure)) may deform the second lid member 173.

The cell case 120 is made of a rigid material, has a substantially rectangular bottom face 122, a side wall part 124 surrounding the bottom face, and a top face forming a first opening 126, and arranges the laminated body 140 therein. The laminated body 140 has unit cells 10 laminated one on another, high-voltage tabs 150 and 152, and spacers 160 and 162. The first opening 126 is positioned to face a top face (first face) 142 of the laminated body 140 in terms of a laminated direction S of the unit cells 10.

The high-voltage tabs 150 and 152 are plate-like coppers, are used to take current out of the laminated body 140 (laminated unit cells 10), and are in contact with a lowermost-layer unit cell 10 and an upper-most-layer unit cell 10, respectively.

The spacers 160 and 162 are insulating sheets having a function of absorbing vibration applied to the laminated body 140 and are arranged on outer sides of the high-voltage tabs 150 and 152, respectively. Namely, the spacers 160 and 162 are positioned at the top face (first face) 142 and a bottom face (second face) 144 of the laminated body 140. The spacers 160 and 162 may be omitted as and when required.

The first lid member 170 tightly closes the first opening 126, and according to the Embodiment 1, is made of an elastic film. The elastic film is made of, for example, urethane rubber.

The first cover plate 176 has openings 178 and is arranged to cover and guard the first lid member 170. The first cover plate 176 is a backup plate that is made of a light material having good rigidity such as aluminum. The first cover plate 176 and first lid member 170 are fixed to the cell case 120 with the use of fastening members such as screws. The fastening members may also be used as fastening material to be used when installing the battery pack 100 in the vehicle 198.

The decompressor 190 is a pressure applying device having a vacuum pump and is used to decrease an internal pressure of the cell case 120 lower than atmospheric pressure (external pressure). The control unit 194 is used to control the decompressor 190.

The first lid member 170 covering the first opening 126 is, before the inside of the cell case 120 is decompressed (when an internal pressure of the cell case 120 is equal to atmospheric pressure), spaced apart from the laminated body 140 as illustrated in FIG. 4. When the decompressor 190 decompresses the inside of the cell case 120, the first lid member 170 deforms due to a differential pressure between atmospheric pressure and the internal pressure of the cell case 120 while maintaining the tightly closing state, comes into contact with the spacer 160, and applies a pressure thereto according to the differential pressure.

Namely, the first lid member 170 is configured to be deformable while tightly closing the first opening 126, deform when the inside of the cell case 120 is decompressed (the internal pressure of the cell case 120 becomes lower than atmospheric pressure), come into contact with the top face 142 of the laminated body 140, and apply a pressure based on the differential pressure to the contacting face. The pressing force on the laminated body 140 is a pressure based on the differential pressure between atmospheric pressure and the internal pressure of the cell case 120. Accordingly, without enlarging, for example, the decompressor (pressure applying device) 190 for decompressing the inside of the cell case 120, a total pressing pressure increases according to an increase in a unit cell (electrode) area. Even if the electrode area is large, it is possible to easily apply a proper pressing pressure to the laminated body 140.

The laminated body 140 is strongly fixed to the high-rigidity cell case 120 with, as mentioned above, the pressure based on the differential pressure between atmospheric pressure and the internal pressure of the cell case 120. As a result, fixing the battery pack 100 to the vehicle 198 may stabilize the battery pack 100 as a whole.

The cell case 120 further includes an insulating film layer 128, high-voltage connectors 130 and 132, a discharge connector 134, a pressure release valve 136, a pressure sensor 138, and low-voltage connectors (not illustrated).

The insulating film layer 128 is formed on inner walls of the bottom face 122 and side wall part 124. Positioned on the insulating film layer 128 on the bottom face 122 is the spacer 162. The high-voltage connectors 130 and 132 are air-tightly attached to the side wall part 124 and are electrically connected to the high-voltage tabs 150 and 152. The discharge connector 134 is air-tightly attached to the side wall part 124 and is connected to piping from the decompressor 190. As a result, the decompressor 190 is able to discharge air from the inside of the cell case 120, thereby decompressing the inside of the cell case 120.

The pressure release valve 136 is air-tightly attached to the side wall part 124, and when the internal pressure of the cell case 120 excessively increases due to, for example, an unexpected cause, is used to discharge a gas from the inside of the cell case 120 and decrease the internal pressure of the cell case 120. A gas discharging mechanism for the pressure release valve 136 is not particularly limited and is able to employ, for example, a metal thin film that cleaves at a predetermined pressure.

The pressure sensor 138 is arranged inside the cell case 120 and is used to measure an internal pressure of the cell case 120. The low-voltage connectors (not illustrated) are airtightly attached to the side wall part 124 and are used to monitor (detect) a voltage of the unit cells contained in the laminated body 140.

The decompressor 190 is controlled by the control unit 194 according to the internal pressure measured by the pressure sensor 138 and is configured to be activated if the internal pressure measured by the pressure sensor 138 is equal to or greater than an upper limit value, thereby decreasing the pressure in the cell case 120.

The internal pressure upper limit value is set in consideration of the differential pressure between atmospheric pressure and the internal pressure of the cell case 120. This prevents an unexpected increase in the internal pressure of the cell case 120 and secures a good pressing pressure (a pressure based on the differential pressure). The internal pressure upper limit value is set to, for example, 0.25 atmospheres. In this case, a sufficient pressing pressure is obtainable.

The decompressor 190 is configured to stop decreasing the pressure inside the cell case 120 if the internal pressure measured by the pressure sensor 138 reaches a lower limit value. The internal pressure lower limit value is set to, for example, 0.15 atmospheres. This level is equal to a multi-purpose vacuum degree, and therefore, a decompressor (a vacuum source) used for another purpose can be used as the decompressor 190 for the system (the vehicle 198) in which the battery pack 100 is installed.

The unit cells 10 contained in the laminated body 140 will be explained in detail.

Figure 5:
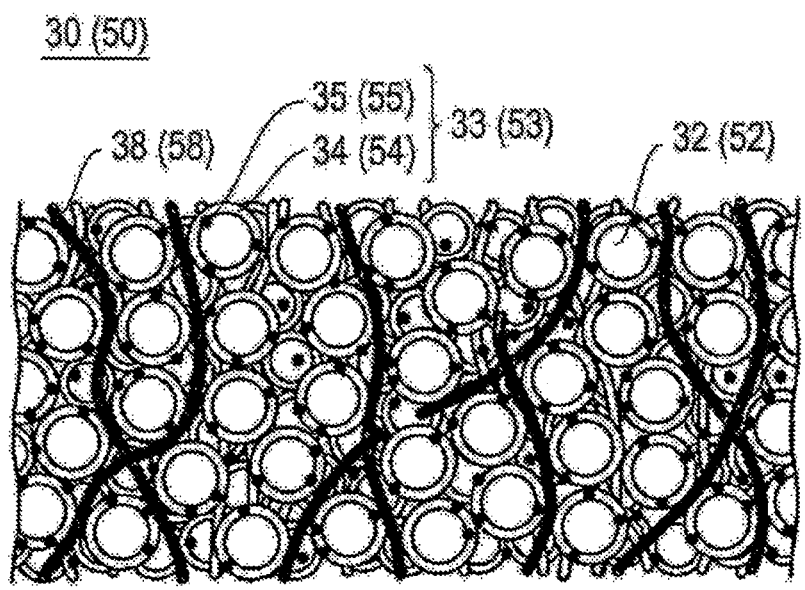
FIG. 5 is a sectional view illustrating a laminated body illustrated in FIG. 3.
Figure 6:
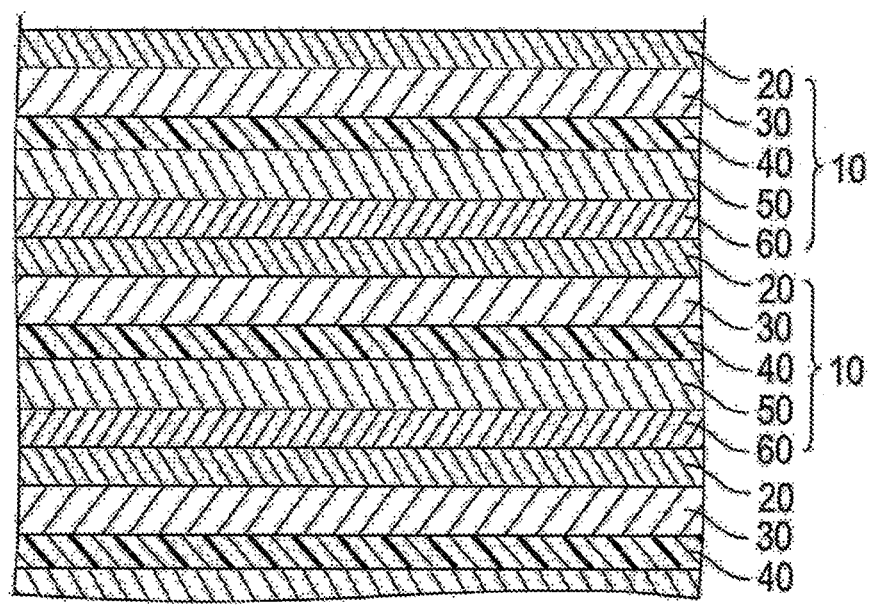
FIG. 6 is a sectional view illustrating positive electrode layers and negative electrode layers illustrated in FIG. 5.

FIG. 5 is a sectional view illustrating the laminated body illustrated in FIG. 3 and FIG. 6 is a sectional view illustrating positive electrode layers and negative electrode layers illustrated in FIG. 5.

The unit cells 10 laminated one on another in the laminated body 140 are connected in series. As illustrated in FIG. 6, each unit cell is formed by sequentially laminating a positive electrode collector layer 20, a positive electrode layer 30, a separator 40, a negative electrode layer 50, and a negative electrode collector layer 60 and by sealing the peripheries thereof.

The positive electrode collector layer 20 and negative electrode collector layer 60 each are a resin collector mainly containing conductive filler and resin. This configuration reduces the weight of the positive electrode collector layer 20 and negative electrode collector layer 60 and improves internal short-circuit resistivity, thereby enabling the use of high-capacity active materials.

The conductive filler is made of, for example, aluminum, stainless steel, carbon such as graphite and carbon black, silver, gold, copper, and titanium. The resin is, for example, polyethylene, polypropylene, polyethylene terephthalate, polyether nitrile, polyimide, polyamide, polytetrafluoroethylene, styrene-butadiene rubber, polyacrylonitrile, polymethyl acrylate, polymethyl methacrylate, polyvinyl chloride, polyvinylidene fluoride, and mixtures thereof.

The positive electrode collector layer 20 and negative electrode collector layer 60 are not limited to the resin collectors. They may be made of, for example, metal or conductive polymeric material. The metal is, for example, aluminum, nickel, iron, stainless steel, titanium, and copper.

The conductive polymeric material is, for example, polyaniline, polypyrrole, polythiophene, polyacetylene, polyparaphenylene, polyphenylene vinylene, polyacrylonitrile, polyoxadiazole, and mixtures thereof.

As and when required, only one of the positive electrode collector layer 20 and negative electrode collector layer 60 may be made of a resin collector.

The positive electrode layer 30 is a sheet-like electrode positioned between the positive electrode collector layer 20 and the separator 40, and as illustrated in FIG. 5, contains positive electrode active material particles 32 and fibrous material 38.

The positive electrode active material particles 32 each have a coating layer 33 on at least part of the surface thereof.

The coating layer 33 is made of conductive adjuvant 35 and coating resin 34 and is able to relax a volumetric change of the positive electrode layer 30 and suppress an expansion of the electrode.

The positive electrode active material particles 32 are made of complex oxide of lithium and transition metal, transition metal oxide, transition metal sulfide, conductive polymer, and the like. The complex oxide of lithium and transition metal is, for example, $LiCoO_2$, $LiNiO_2$, $LiMnO_2$, and $LiMn_2O_4$. The transition metal oxide is, for example, $MnO_2$ and $V_2O_5$. The transition metal sulfide is, for example, $MoS_2$ and $TiS_2$. The polymer is, for example, polyaniline, polyvinylidene fluoride, polypyrrole, polythiophene, polyacetylene, poly-p-phenylene, and polycarbazole.

The coating resin 34 is preferably vinyl resin, urethane resin, polyester resin, and polyamide resin. As and when required, it may be epoxy resin, polyimide resin, silicon resin, phenol resin, melamine resin, urea resin, aniline resin, ionomer resin, and polycarbonate.

The conductive adjuvant 35 is, for example, metal and carbon such as graphite and carbon black, and mixtures thereof. The metal is aluminum, stainless steel, silver, gold, copper, titanium, and alloys thereof. The carbon black is acetylene black, ketjenblack, furnace black, channel black, thermal lampblack, and the like. As and when required, two or more kinds of adjuvant may be used. The conductive adjuvant 35 is preferably, in view of electrical stability, silver, gold, aluminum, stainless steel, and carbon, more preferably, carbon.

At least part of the fibrous material 38 forms conductive paths of the positive electrode layer 30 and is in contact with the positive electrode active material particles around the conductive paths. Accordingly, electrons generated by the positive electrode active material (positive electrode active material particles 32) quickly reach the conductive paths and are smoothly guided to the positive electrode collector layer 20.

The fibrous material 38 is, for example, carbon fiber such as PAN-based carbon fiber and pitch-based carbon fiber, metal fiber made from metal such as stainless steel, and conductive fiber.

The conductive fiber is one made by uniformly dispersing metal or graphite in synthetic fiber, one made by coating the surface of organic fiber with metal, one made by coating the surface of organic fiber with resin containing conductive material, and the like. In view of electric conductance, the carbon fiber is preferable among the conductive fibers.

An electric conductance of the fibrous material 38 is preferably 50 mS/cm or over. In this case, resistance of the conductive paths is small, and therefore, the movement of electrons is more smoothly achieved from the positive electrode active material (positive electrode active material particles 32) existing away from the positive electrode collector layer 20. The electric conductance is obtainable by measuring a volume resistivity according to JIS R 7609 (2007) "Carbon Fiber—Way of Finding Volume Resistivity" and by taking an inverse of the volume resistivity.

A mean fiber diameter of the fibrous material 38 is preferably 0.1 to 20 μm, more preferably, 0.5 to 2.0 μm. The mean fiber diameter is obtainable by picking up optional 10 pieces of fiber in a view field of 30 μm square, measuring a diameter at about the middle of each fiber piece, conducting such measurements in three view fields, and averaging the diameters of the total 30 fiber pieces.

The sum of fiber lengths of the fibrous material 38 contained in an electrode unit volume is preferably 10000 to 50000000 cm/cm$^3$, more preferably, 20000000 to 50000000 cm/cm$^3$, further preferably, 1000000 to 10000000 cm/cm$^3$.

The sum of fiber lengths is calculated according to an expression of "(sum of fiber lengths of fibrous material contained in active material layer unit volume)=((mean fiber length of fibrous material)×(weight of fibrous material used per active material layer unit area)/(specific gravity of fibrous material))/((active material layer unit area)×(active material layer thickness))".

The negative electrode layer 50 is a sheet-like electrode positioned between the negative electrode collector layer 60 and the separator 40, and as illustrated in FIG. 5, contains negative electrode active material particles 52 and fibrous material 58.

The negative electrode active material particles 52 each have a coating layer 53 on at least part of the surface thereof. The coating layer 53 is made of conductive adjuvant 55 and coating resin 54 and is able to relax a volumetric change of the negative electrode layer 50 and suppress an expansion of the electrode.

The negative electrode active material particles 52 are made of graphite, amorphous carbon, sintered high-molecular compound, kinds of coke, carbon fiber, conductive polymer, tin, silicon, metal alloy, complex oxide of lithium and transition metal, and the like. The sintered high-molecular compound is, for example, carbon material formed by sintering phenol resin and furan resin. The kinds of coke are, for example, pitch coke, needle coke, and petroleum coke. Conductive polymer is, for example, polyacetylene and polypyrrole. The metal alloy is, for example, lithium-tin alloy, lithium-silicon alloy, lithium-aluminum alloy, and lithium-aluminum-manganese alloy. The complex oxide of lithium and transition metal is, for example, $Li_4TiO_{12}$. The coating layer 53, coating resin 54, conductive adjuvant 55, and fibrous material 58 are configured substantially equal to the coating layer 33, coating resin 34, conductive adjuvant 35, and fibrous material 38, and therefore, their explanations are omitted. At least part of the fibrous material 58 forms conductive paths of the negative electrode layer 50 and is in contact with the negative electrode active material particles 52 around the conductive paths.

The positive electrode layer 30 and negative electrode layer 50 with the above-mentioned structures may have a thickness of 150 to 1500 μm. As a result, they are able to contain many active materials to realize high capacity and improve energy density. The thickness of the positive electrode layer 30 and the thickness of the negative electrode layer 50 each are preferably 200 to 950 μm, more preferably, 250 to 900 μm.

The separator 40 is a cellular (porous) insulator positioned between the positive electrode layer 30 and the negative electrode layer 50. When an electrolyte permeates, the separator 40 demonstrates ion permeability and electric conductivity. The electrolyte is, for example, a gel-polymer-based electrolyte having an electrolytic solution and host polymer.

The electrolytic solution includes an organic solvent made of propylene carbonate and ethylene carbonate, and as a supporting electrolyte, lithium salt ($LiPF_6$). The organic solvent may be any other cyclic carbonate, chain carbonate such as dimethyl carbonate, and ether such as tetrahydrofuran. The lithium salt may be any other inorganic acid anionic salt and organic acid anionic salt such as $LiCF_3SO_3$.

The host polymer is PVDF-HFP (copolymer of polyvinylidene fluoride and hexafluoropropylene) containing 10% HFP (hexafluoropropylene) copolymer.

The host polymer may be any other polymer having no lithium ion conductivity or one having ion conductivity (solid polymer electrolyte). The polymer having no lithium ion conductivity is, for example, polyacrylonitrile and polymethylmethacrylate. The polymer having ion conductivity is, for example, polyethylene oxide and polypropylene oxide.

Modifications 1 to 8 according to the Embodiment 1 will be explained successively.

Figure 7:
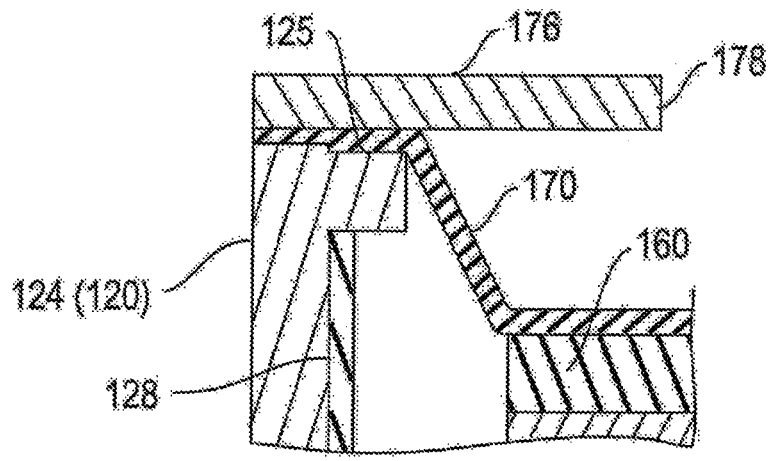
FIG. 7 is a sectional view illustrating Modification 1 according to the Embodiment 1.

FIG. 7 is a sectional view illustrating the Modification 1 according to the Embodiment 1.

The first lid member 170 is held and fixed between the first cover plate 176 and an upper end face 125 of the side wall part 124 of the cell case 120, thereby tightly closing the first opening 126 of the cell case 120. For this, as illustrated in FIG. 7, the upper end face 125 of the side wall part 124 of the cell case 120 to which the first lid member 170 is tightly attached is preferably provided with a stepped configuration. In this case, a good airtightness is achievable.

Figure 8:
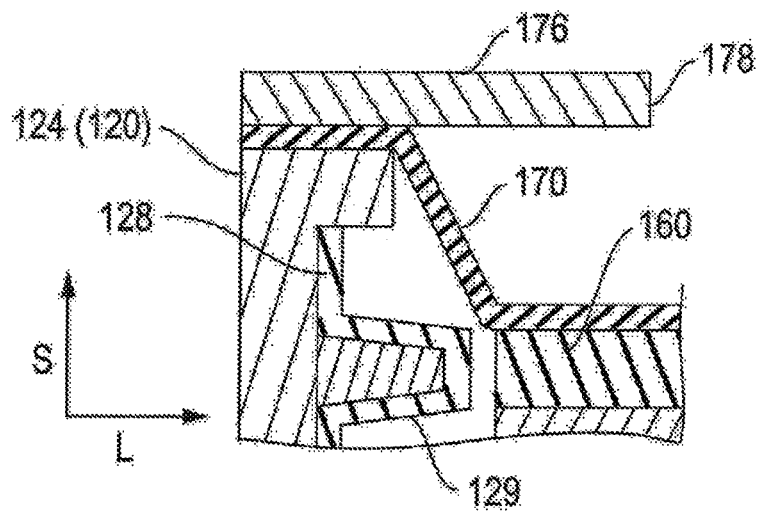
FIG. 8 is a sectional view illustrating Modification 2 according to the Embodiment 1.

FIG. 8 is a sectional view illustrating the Modification 2 according to the Embodiment 1.

The laminated body 140 in actual use will be exposed to shakes and vibrations in a lateral direction L orthogonal to the laminated direction S of the unit cells 10. For this, as illustrated in FIG. 8, it is preferred to arrange a stopper 129 protruding in the lateral direction L on the side wall part 124 of the cell case 120, thereby stopping the movement of the laminated body 140 in the lateral direction L. For example, the stopper 129 is arranged in the vicinity of a position where the first lid member 170 is in contact with the top face 142 of the laminated body 140.

Figure 9:
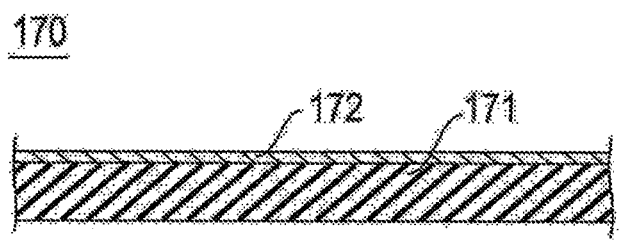
FIG. 9 is a sectional view illustrating Modification 3 according to the Embodiment 1.
Figure 10:
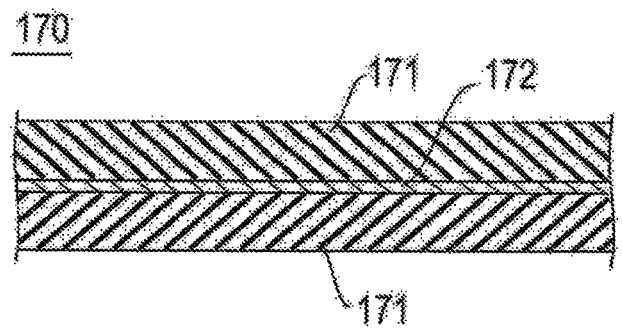
FIG. 10 is a sectional view illustrating Modification 4 according to the Embodiment 1.

FIGS. 9 and 10 are sectional views explaining the Modifications 3 and 4, respectively, according to the Embodiment 1.

The first lid member 170 is not limited to the single elastic film configuration and may have a multilayer structure having, on the surface or inside of an elastic film, a gas barrier metal layer to suppress the transmission of a gas such as water vapor.

For example, as illustrated in FIG. 9, an elastic film 171 may be coated with, on one face, a metal layer 172, or as illustrated in FIG. 10, a metal layer 172 may have, on each face, an elastic film 171. The metal layer 172 is made of, for example, aluminum so that the layer may contract or expand to some extent. It is also possible to coat each face of an elastic film 171 with a metal layer 172.

Figure 11:
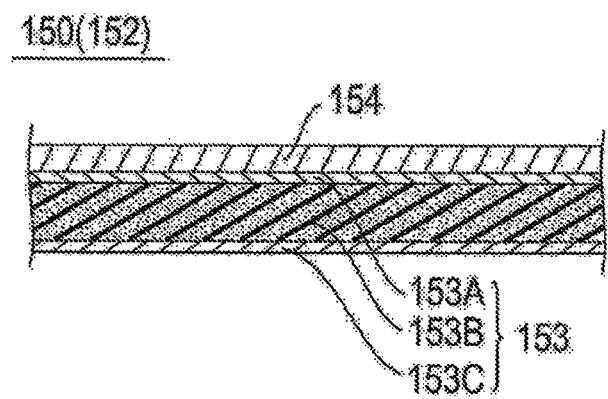
FIG. 11 is a sectional view illustrating Modification 5 according to the Embodiment 1.

FIG. 11 is a sectional view illustrating the Modification 5 according to the Embodiment 1.

The high-voltage tabs 150 and 152 each are preferred to have a two-layer structure including an elastic layer 153 and a support layer 154 arranged on one face of the elastic layer 153. In this case, the elastic layer 153 has elasticity to deform according to a surface shape of the unit cells 10 and is positioned to face the laminated unit cells 10. As a result, the elastic layer 153 is able to decrease contact resistance with respect to the uppermost (contacting) unit cell 10. On the other hand, the support layer 154 is made of, for example, plate-like copper to secure strength and rigidity required for the high-voltage tabs 150 and 152. Namely, the strength and rigidity of the support layer 154 are greater than the strength and rigidity of the elastic layer 153.

The elastic layer 153 includes, for example, a conductive cloth 153A, a conductive urethane foam 153B, and a conductive nonwoven cloth 153C. The conductive cloth 153A faces the support layer 154 and is selected in consideration of adhesiveness with respect to the support layer 154. The conductive nonwoven cloth 153C faces the unit cells 10 and is selected in consideration of adhesiveness with respect to the unit cells 10. The conductive urethane foam 153B is positioned between the conductive cloth 153A and the conductive nonwoven cloth 153C and is selected in consideration of deformability according to the surface shape (unevenness) of the unit cells 10.

Figure 12:
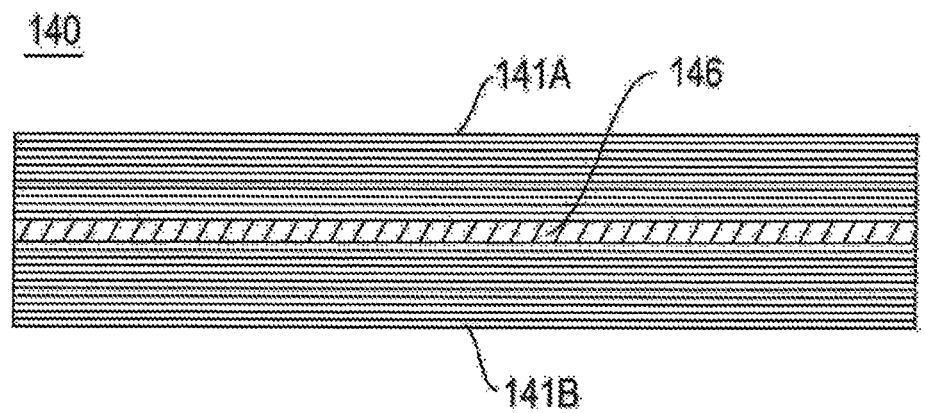
FIG. 12 is a sectional view illustrating Modification 6 according to the Embodiment 1.

FIG. 12 is a sectional view illustrating the Modification 6 according to the Embodiment 1.

As illustrated in FIG. 12, the laminated body 140 is preferred to be divided into a plurality of blocks 141A and 141B in terms of the laminated direction S with a conductive elastic member 146 interposed between the adjacent blocks. In this case, the elastic member 146 is substantially a plate and has elasticity to deform according to the surface shape of the uppermost layer unit cell 10 of each of the blocks 141A and 141B, to reduce contact resistance inside the laminated body 140. The number of divided blocks of the laminated body 140 is not particularly limited and is properly set according to, for example, the number of laminations of the unit cells 10 and the area of each unit cell 10 (electrode).

Figure 13:
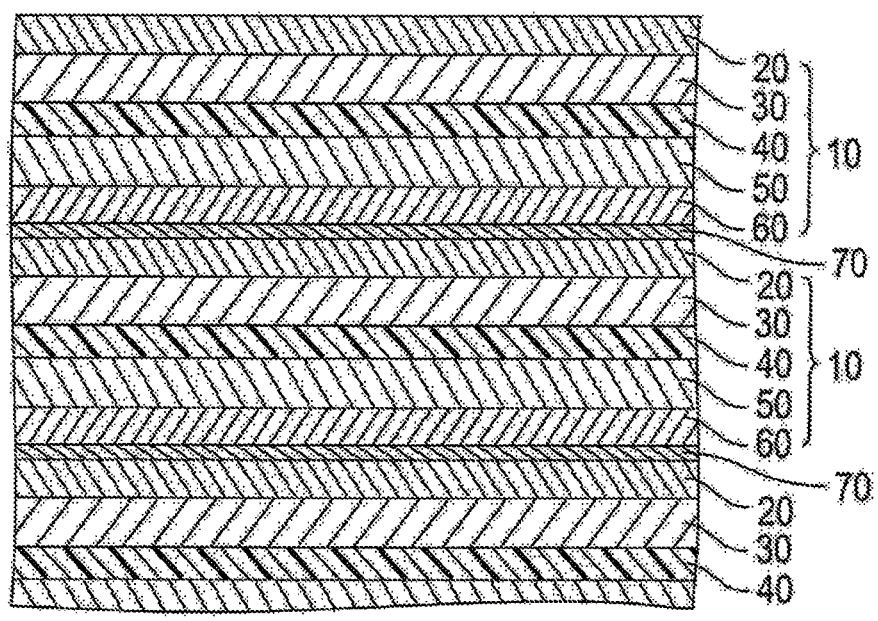
FIG. 13 is a sectional view illustrating Modification 7 according to the Embodiment 1.

FIG. 13 is a sectional view illustrating the Modification 7 according to the Embodiment 1.

As illustrated in FIG. 13, it is preferable to arrange a conductive layer 70 between the adjacent unit cells 10. This can be reduce contact resistance between the unit cells 10.

Figure 14:
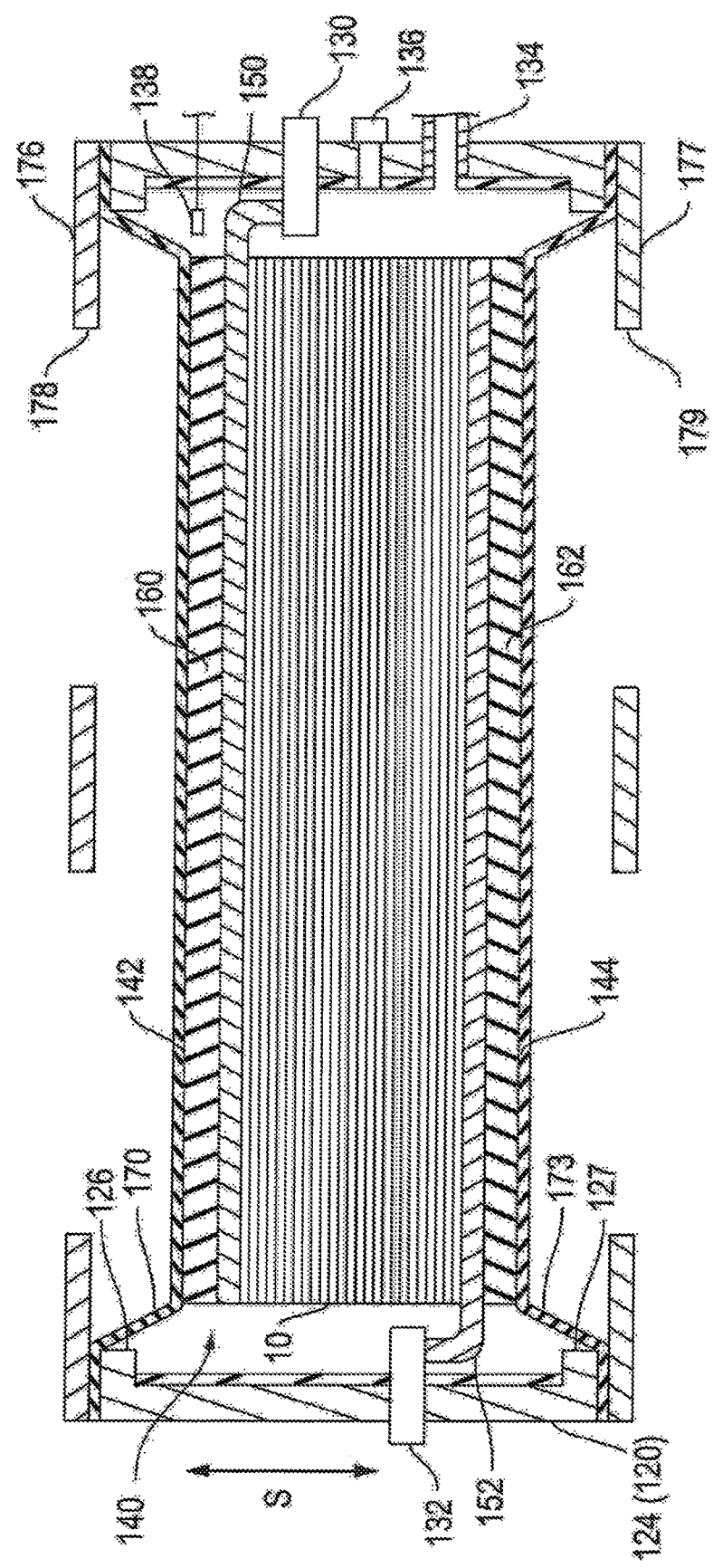
FIG. 14 is a sectional view illustrating Modification 8 according to the Embodiment 1.

FIG. 14 is a sectional view illustrating the Modification 8 according to the Embodiment 1.

It is not limited to the configuration that applies, only to the top face (first face) 142 of the laminated body 140, a pressure based on a differential pressure between atmospheric pressure (external pressure) and an internal pressure of the cell case 120. It is also possible to apply, to the bottom face (second face) 144 of the laminated body 140, the pressure based on the differential pressure between atmospheric pressure and the internal pressure of the cell case 120.

In this case, the main body unit 110 further includes, as illustrated in FIG. 14, a second lid member 173 made of flexible material and a second cover plate 177. The cell case 120 has, instead of the bottom face 122, a second opening 127.

The second opening 127 is positioned to face the bottom face (second face) 144 of the laminated body 140 and is closed with the second lid member 173. The second lid member 173 is deformable while tightly closing the second opening 127, and when the decompressor 190 reduces pressure inside the cell case 120 (reducing the internal pressure of the cell case 120 lower than atmospheric pressure), deforms to come into contact with the spacer 162 and apply the differential pressure thereto. Namely, the second lid member 173 is configured to come into contact with the bottom face 144 of the laminated body 140 and apply a pressure based on the differential pressure to the contacting face.

The second cover plate 177 has openings 179 and is arranged to cover and guard the second lid member 173.

As explained above, the Embodiment 1 decreases pressure inside the cell case (decreasing an internal pressure of the cell case lower than an external pressure (atmospheric pressure)) so that a pressure based on a differential pressure, between the external pressure and the internal pressure of the cell case is applied by the first lid member, which keeps an airtightly closing state and is deformed, to the first face of the laminated body in which the unit cells are laminated one on another. Namely, the pressing pressure on the laminated body in which the unit cells are laminated one on another is created by the pressure based on the differential pressure. Accordingly, without enlarging, for example, the decompressor (pressure applying device) for decompressing inside the cell case, a total pressing pressure increases according to an increase in the area of the unit cell (electrode). it is possible, therefore, to provide a battery pack that is capable of, even if the area of each electrode is large, easily applying a proper pressing pressure to the laminated body in which the unit cells are laminated one on another.

In the case of employing the second lid member to apply, to the second face of the laminated body, the pressure based on the differential pressure, a part (bottom face) of the cell case facing the second face of the laminated body is omissible.

The first lid member may be made of an elastic film to realize a simple configuration.

If the elastic film is provided with a metal layer on the surface or inside thereof, a gas barrier capability will improve.

If a stopper is arranged to stop the movement of the laminated body in a lateral direction orthogonal to the laminated direction of the unit cells, an influence on the laminated body will be suppressed when the battery pack is shaken or vibrated in the lateral direction.

If an internal pressure measured by the pressure sensor is equal to or greater than an upper limit value that is set in consideration of the differential pressure, the decompressor decreases pressure inside the cell case, to prevent an unexpected increase in the internal pressure of the cell case and secure a good pressing pressure (a pressure based on the differential pressure).

If the internal pressure upper limit value is 0.25 atmospheres, a sufficient pressing pressure is obtainable.

If it is configured to stop decreasing the internal pressure of the cell case when the internal pressure reaches a lower limit value set at 0.15 atmospheres, the internal pressure level is equal to a multipurpose vacuum level. Accordingly, a system in which a battery pack must be installed is able to employ a decompressor (vacuum source) of any other purpose as the decompressor of the battery pack.

If the high-voltage tab is configured to have an elastic layer having elasticity to deform according to a surface shape of the unit cells and a support layer having strength and rigidity greater than the strength and rigidity of the elastic layer, contact resistance between the high-voltage tab and the unit cells can be reduced.

If a pressure release valve for decreasing the internal pressure of the cell case is arranged, it is possible to suppress an excessive increase in the internal pressure of the cell case due to an unexpected cause.

If the laminated body is divided into a plurality of blocks in terms of the laminated direction and if a plate-like elastic member having elasticity to deform according to a surface shape of the blocks is arranged between the adjacent blocks, contact resistance inside the laminated body can be reduced.

If the thickness of the positive electrode layer and the thickness of the negative electrode layer are set to be equal to or greater than 150 μm, the capacity and energy density of each unit cell can be increased.

If the fibrous material is carbon fiber, a good electric conductance is obtainable.

If a conductive layer is arranged between adjacent unit cells, contact resistance between the unit cells can be reduced.

If the positive electrode collector layer and/or the negative electrode collector layer are each a resin collector mainly containing conductive filler and resin, each collector layer becomes lightweight and improves internal short-circuit resistivity to make it possible to employ an active material of higher capacity.

Even if the area of each electrode is large, the battery pack is capable of easily applying a proper pressing pressure to the laminated body in which the unit cells are laminated one on another. The area of each electrode of each unit cell can be increased to easily realize a high energy density. If used as a power source for a vehicle, the battery pack can extend, for example, a cruising distance per charge.

Embodiment 2 will be explained.

Figure 15:
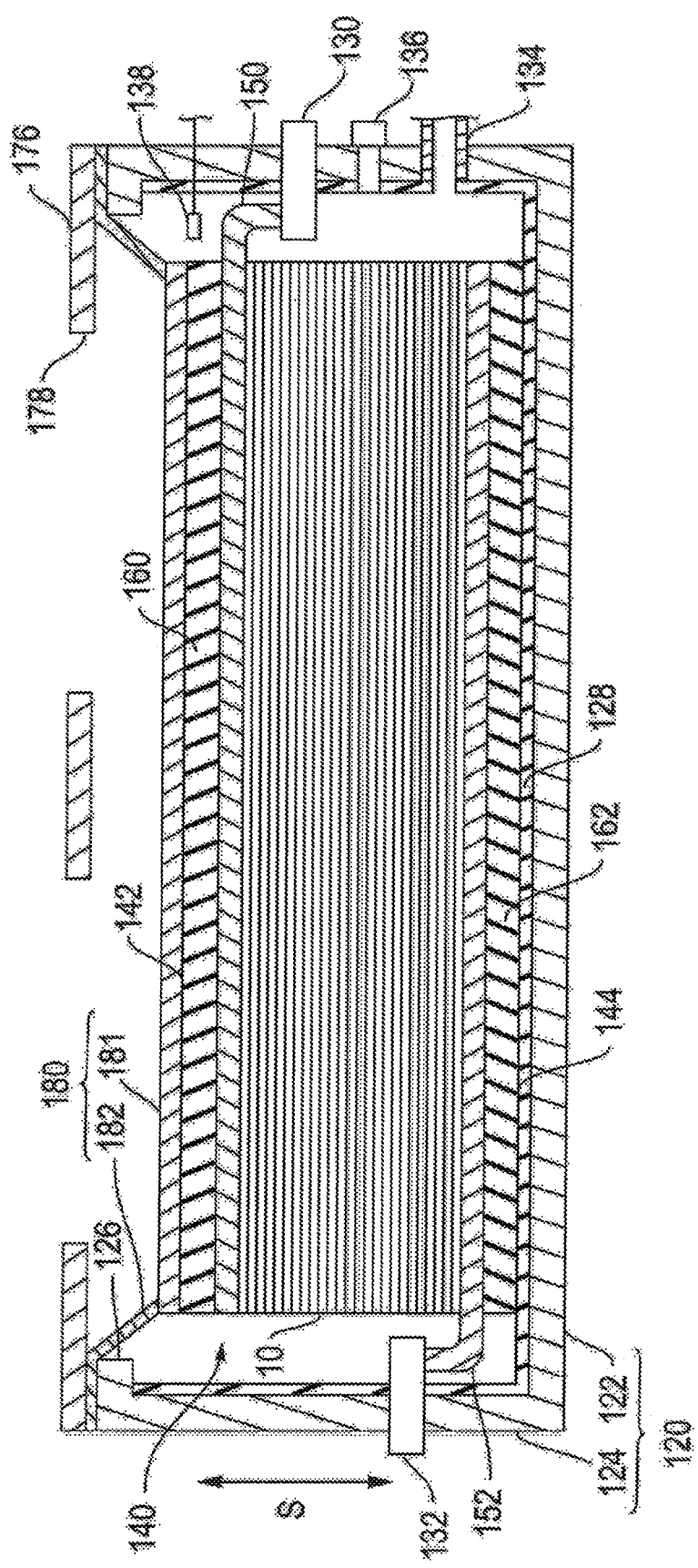
FIG. 15 is a sectional view illustrating a battery pack according to Embodiment 2.
Figure 16:
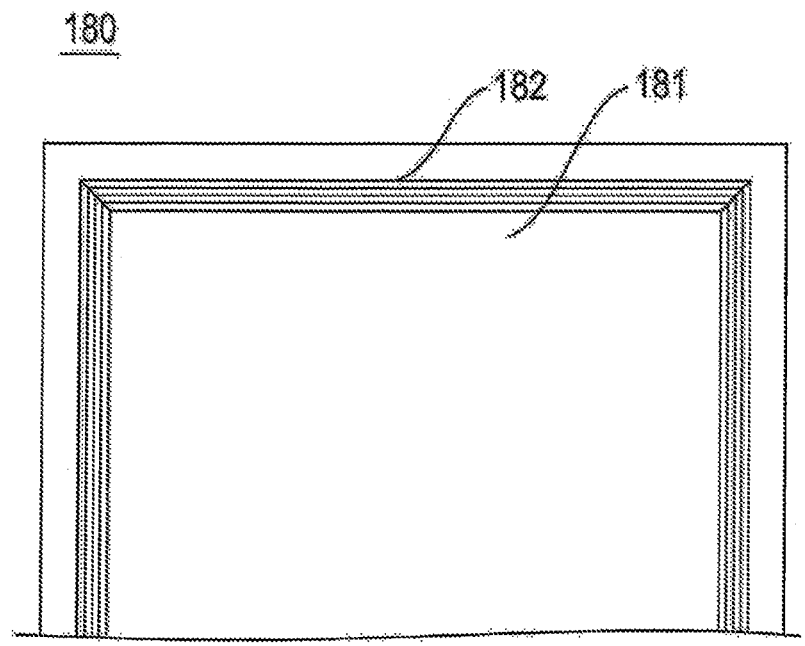
FIG. 16 is a plan view illustrating a shape before decompression of a first lid member illustrated in FIG. 15.

FIG. 15 is a sectional view illustrating a battery pack according to the Embodiment 2 and FIG. 16 is a plan view illustrating a before-decompression shape of a first lid member illustrated in FIG. 15.

When the internal pressure of a cell case 120 is decreased (the internal pressure of the cell case 120 being decreased lower than atmospheric pressure (external pressure)), a differential pressure between atmospheric pressure and the internal pressure of the cell case 120 deforms the first lid member that keeps a tightly closed state, so that the first lid member comes into contact with a first face of the laminated body 140 and applies a pressure based on the differential pressure to the contacting face. This first lid member is not limited to the configuration realized by the first lid member 170 made of an elastic film. For example, the first lid member 180 illustrated in FIGS. 15 and 16 is employable. This also realizes a simple configuration. The Embodiment 2 except the first lid member 180 is substantially the same as the Embodiment 1, and therefore, explanations of the other parts will appropriately be omitted.

The first lid member 180 has a plate-like part 181 and a freely expandable and contractible part 182. The plate-like part 181 has a shape substantially agreeing with the top face (first face) 142 of the laminated body 140. The freely expandable/contractible part 182 surrounds the periphery of the plate-like part 181, and when the inside pressure of the cell case 120 is decreased, expands to bring the plate-like part 181 into contact with the top face 142 of the laminated body 140, thereby applying a differential-pressure-based pressure to the contacting face.

The freely expandable/contractible part 182 has a bellows structure. In this case, the freely expandable/contractible part 182 can have a simple structure.

Modifications 1 to 3 according to the Embodiment 2 will be explained successively.

Figure 17:
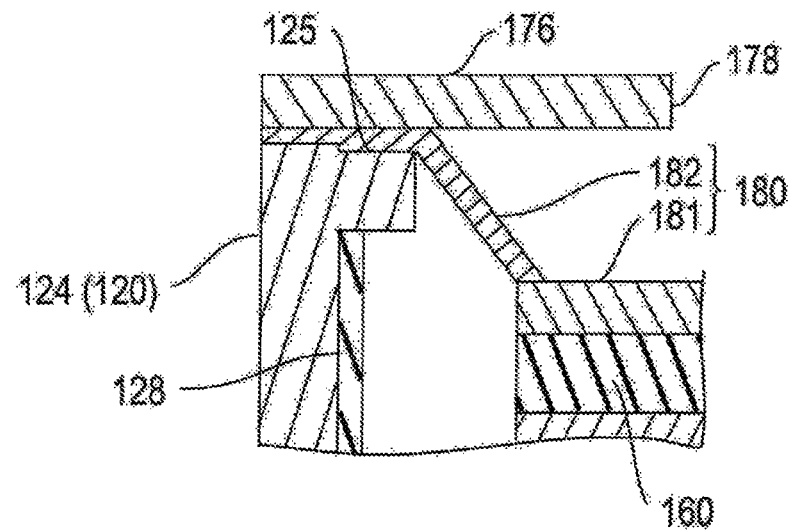
FIG. 17 is a sectional view illustrating Modification 1 according to the Embodiment 2.

FIG. 17 is a sectional view illustrating the Modification 1 according to the Embodiment 2.

The freely expandable and contractible part 182 of the first lid member 180 is held and fixed between the first cover plate 176 and an upper end face 125 of the side wall part 124 of the cell case 120, thereby tightly closing the first opening 126 of the cell case 120. Accordingly, similar to the Modification 1 (FIG. 7) of the Embodiment 1, the upper end face 125 of the side wall part 124 of the cell case 120 to which the freely expandable/contractible part 182 is tightly attached is preferably provided with a stepped configuration as illustrated in FIG. 17.

Figure 18:
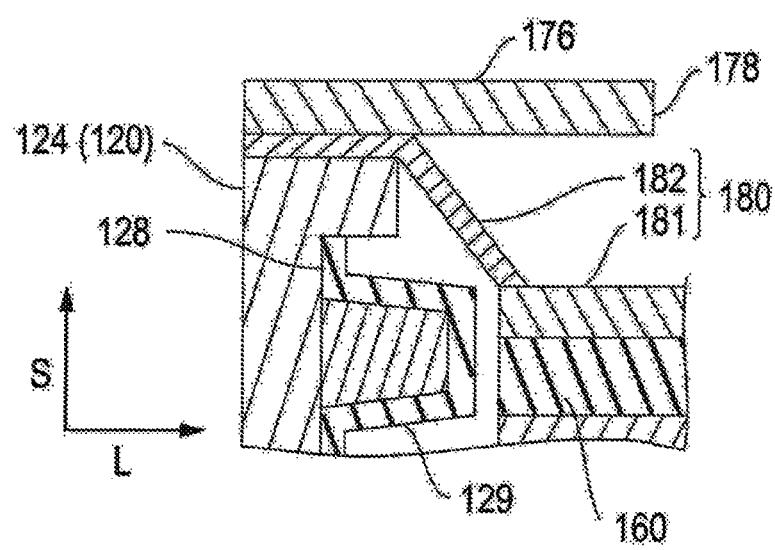
FIG. 18 is a sectional view illustrating Modification 2 according to the Embodiment 2.

FIG. 18 is a sectional view illustrating the Modification 2 according to the Embodiment 2.

As illustrated in FIG. 18, a stopper 129 protruding in the lateral direction L is preferred to be arranged on the side wall part 124 of the cell case 120 similar to the Modification 2 (FIG. 8) of the embodiment 1, to stop the movement of the laminated body 140 in the lateral direction L.

Figure 19:
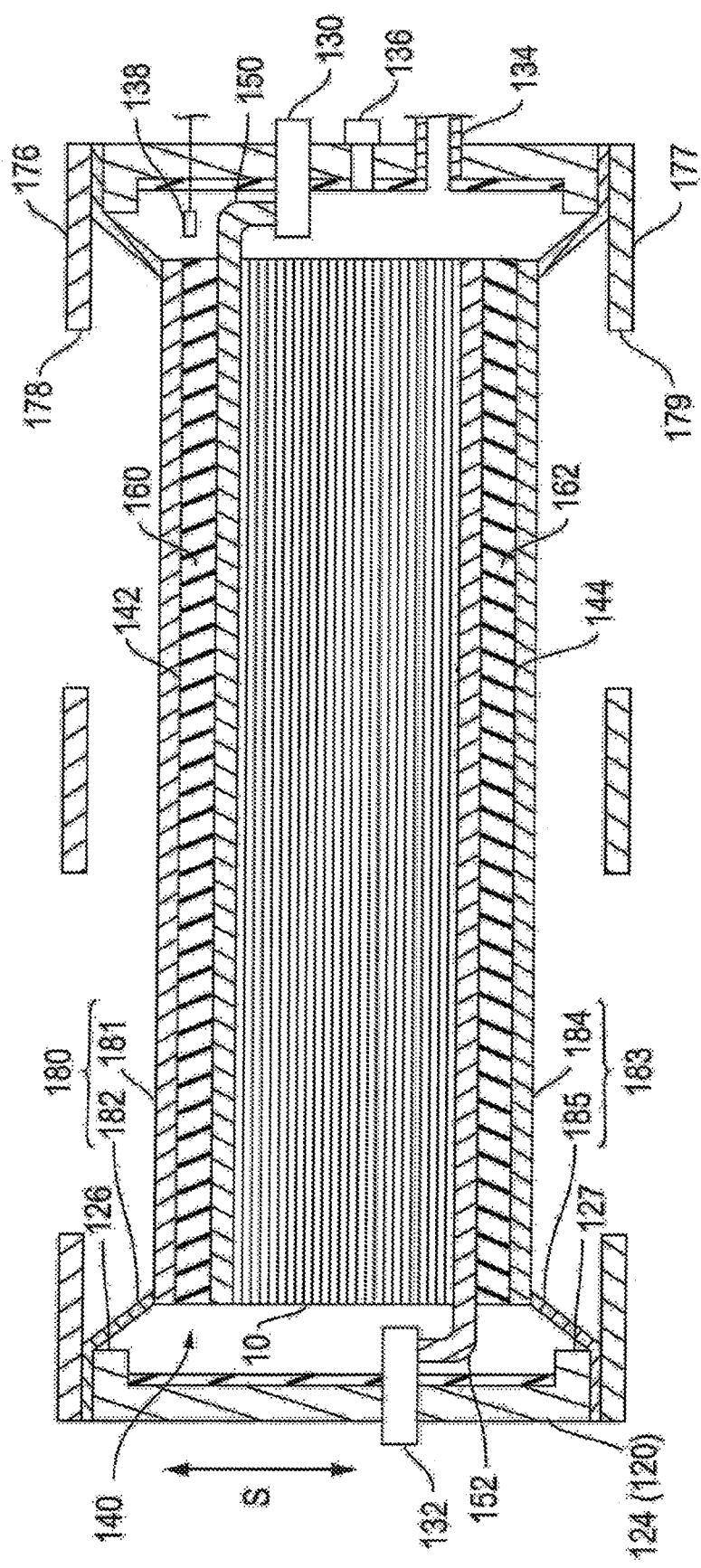
FIG. 19 is a sectional view illustrating Modification 3 according to the Embodiment 2.

FIG. 19 is a sectional view illustrating the Modification 3 according to the Embodiment 2.

Similar to the Modification 8 (FIG. 14) of the Embodiment 1, the Embodiment 2 is able to apply, to the bottom face (second face) 144 of the laminated body 140, a pressure based on a differential pressure between atmospheric pressure and an internal pressure of the cell case 120.

In this case, as illustrated in FIG. 19, the main body unit 110 further includes a second lid member 183 and a second cover plate 177. The second lid member 183 has a plate-like part 184 and a freely expandable/contractible part 185. When the inside of the cell case 120 is decompressed, the freely expandable/contractible part 185 expands to bring the plate-like part 184 into contact with the bottom face (second face) 144 of the laminated body 140, thereby applying the pressure based on the differential pressure thereto.

As explained above, the Embodiment 2 employs the first lid member of simple structure having the plate-like part and freely expandable/contractible part, to apply a pressure based on a differential pressure between the external pressure (atmospheric pressure) and internal pressure of the cell case to the first face of the laminated body in which the unit cells are laminated one on another. Accordingly, without enlarging the decompressor (pressure applying device) that decompresses the inside of the cell case, and decreases the internal pressure of the cell case lower than the external pressure, a total pressing pressure increases according to an increase in a unit cell (electrode) area. As a result, the Embodiment 2 is also capable of providing a battery pack that is able to apply, even if the area of each electrode is large, a proper pressing pressure to the laminated body in which the unit cells are laminated one on another.

The freely expandable/contractible part has a bellows structure, and therefore, is realizable with a simple structure.

Embodiment 3 will be explained.

Figure 20A:
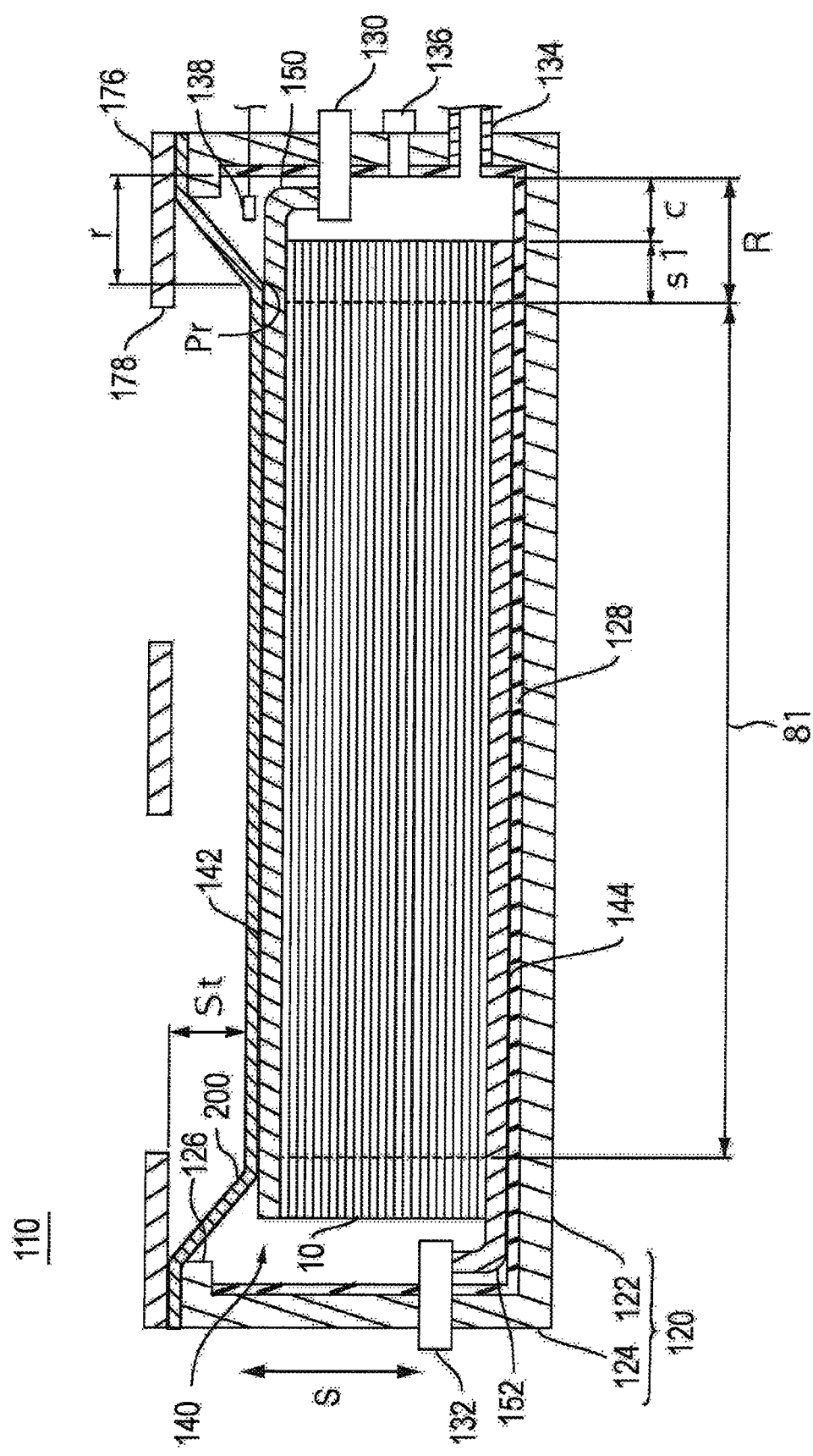
FIG. 20A is a sectional view illustrating a battery pack according to Embodiment 3.
Figure 20B:
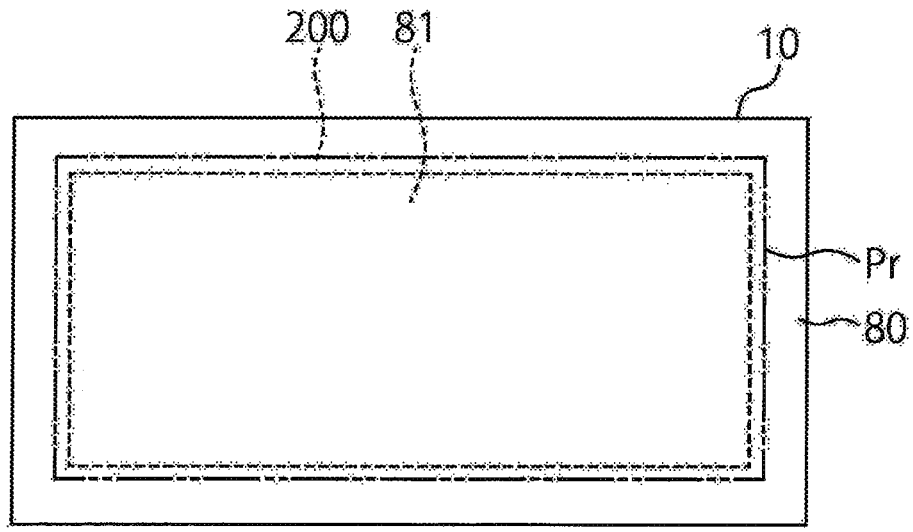
FIG. 20B is a plan view of unit cells seen in a laminated direction, schematically illustrating relationship between an area in which a first lid member is in contact with a laminated body and an area of the unit cells that contributes to electric generation.
Figure 21:
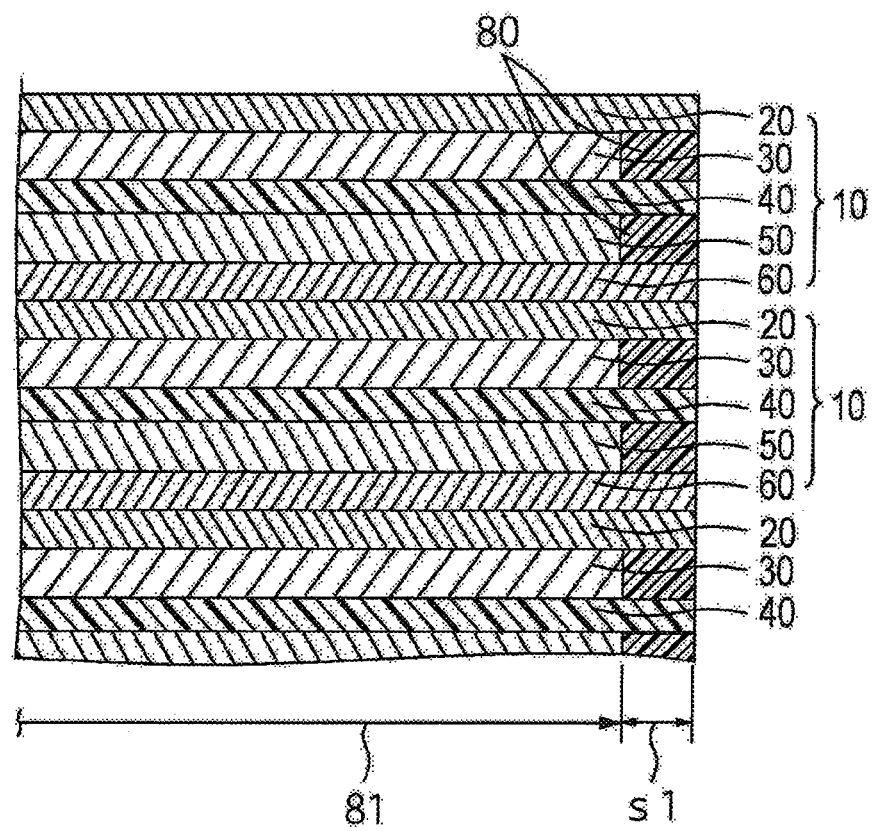
FIG. 21 is a sectional view illustrating a sealed state of the peripheries of the unit cells contained in the laminated body.

FIG. 20A is a sectional view illustrating a battery pack according to the Embodiment 3. In FIG. 20A, a first lid member is in a deformed state due to a differential pressure. FIG. 20B schematically illustrates, in a plan view of unit cells seen in a laminated direction, a relationship between an area in which the first lid member is in contact with the laminated body and a part of the unit cells that contributes to power generation. FIG. 21 is a sectional view illustrating a sealed state of the peripheries of the unit cells contained in the laminated body.

The first lid member is configured to, when the inside of a cell case 120 is decompressed (to decrease the internal pressure of the cell case 120 lower than atmospheric pressure (external pressure)), keep a tightly closing state, deform due to a differential pressure between atmospheric pressure and the internal pressure of the cell case 120, come into contact with a first face 142 of the laminated body 140, and apply a pressure based on the differential pressure to the contacting face. Such a first lid member is not limited to the first lid member 170 made of an elastic film (Embodiment 1) or the first lid member 180 having the plate-like part 181 and freely expandable/contractible part 182 (Embodiment 2). For example, the first lid member 200 illustrated in FIG. 20A is employable. In this case, a simple configuration is also realized. According to the Embodiment 3, the laminated body 140 has the laminated unit cells 10 and high-voltage tabs 150 and 152. No spacers 160 and 162 are arranged. Omitting the spacers 160 and 162 can reduce the height dimension of the battery pack 100. The Embodiment 3 except the first lid member 200 and spacers 160 and 162 is substantially the same as the Embodiments 1 and 2, and therefore, explanations of the other configurations are omitted.

The first lid member 200 is a single-layer metal plate. This first lid member 200 elastically deforms when the internal pressure of the cell case 120 is lower than the external pressure of the cell case 120, comes into contact with the first face 142 of the laminated body 140, and applies a pressure based on the differential pressure to the contacting face. With the single-layer metal plate, the first lid member 200 is realizable in a simple structure.

As illustrated in FIG. 21, the unit cells 10 according to the Embodiment 3 include a seal part 80 that seals the peripheries of the unit cells 10. The unit cells 10 are connected in series, and in each of which, a positive electrode collector layer 20, a positive electrode layer 30, a separator 40, a negative electrode layer 50, and a negative electrode collector layer 60 are sequentially laminated one on another. The peripheries of the positive electrode layers 30 and negative electrode layers 50 are sealed with the seal part 80. The unit cells 10 except the seal part 80 according to the Embodiment 3 are substantially the same as the unit cells 10 of the Embodiment 1, and therefore, explanations of the other configurations will suitably be omitted.

The seal part 80 is arranged to surround the peripheries of the positive electrode layers 30 and negative electrode layers 50. Material to form the seal part 80 may be any that has an insulating capability, sealing capability, heat resistance under operating temperatures of the battery, and the like. The seal part 80 is made of, for example, thermoplastic resin. More precisely, urethane resin, epoxy resin, polyethylene resin, polypropylene resin, polyimide resin, and the like are employable.

A part of the laminated unit cells 10 that contributes to power generation is, as represented with a reference numeral 81 in FIG. 21, an area inside the peripheries of the unit cells 10 where the seal part 80 is arranged. The "part of the laminated unit cells 10 that contributes to power generation" is hereunder simply referred to as the power generation area 81.

In FIG. 20A, a reference mark c indicates a clearance between an inner face of the cell case 120 and a side face of the laminated body 140. A reference mark s1 indicates a length of the seal part 80 from the side face of the laminated body 140, i.e., a length of a part of the laminated unit cells 10 that has no contribution to power generation. A reference mark R is "R=c+s1" and indicates a length from the inner face of the cell case 120 to a position from where the power generation area 81 starts. A reference mark St indicates a displacement of the first lid member 200 along the laminated direction of the unit cells 10 from a state in which an internal pressure of the cell case 120 is equal to an external pressure of the cell case 120 up to a state in which decompression brings the first lid member 200 in contact with the first face 142 of the laminated body 140. The "displacement of the first lid member 200 along the laminated direction of the unit cells 10" is hereafter also referred to as the stroke. A reference mark Pr indicates a location where the first lid member 200 starts to come into contact with the first face 142 of the laminated body 140. A reference mark r indicates a horizontal length from the inner face of the cell case 120 to Pr.

With reference to FIGS. 20A and 20B, a relationship between an area in which the first lid member 200 is in contact with the laminated body 140 and the power, generation area 81 will be explained. In FIG. 20B, the location Pr where the first lid member 200 starts to come into contact with the laminated body 140 is indicated with a two-dot chain line and the power generation area 81 with a broken line.

As illustrated in FIG. 20B with the unit cells 10 being seen in a plan view in terms of the laminated direction, the first lid member 200 comes into contact with, in an area larger than the power generation area 81, the first face 142 of the laminated body 140. The unit cells 10 of the Embodiment 3 include the seal part 80 to seal the peripheries of the unit cells 10 and the power generation area 81 is inside the seal part 80. Accordingly, the first lid member 200 is in contact with, in at least a part of the seal part 80 and in the power generation area 81, the first face 142 of the laminated body 140.

If the power generation area 81 includes a part that is in contact with the first lid member 200 and a part that is not in contact therewith, these parts will have different resistance values to cause different output voltage values. This will cause a local deterioration of the unit cells 10. As illustrated in FIG. 20A, within the area of the reference mark R (the length from the inner face of the cell case 120 up to the position where the power generation area 81 starts), the first lid member 200 is in contact with the first face 142 of the laminated body 140 (R≥r), and therefore, the first lid member 200 is able to uniformly pressurize the whole of the part corresponding to the power generation area (uniform pressurization characteristic). This can suppress the local deterioration of the unit cells 10.

The first lid member 200 is preferred to satisfy the uniform pressurization characteristic to uniformly pressurize the part corresponding to the power generation area 81, and in addition, have a large stroke St. Setting a large stroke means allowing a large height tolerance for the laminated body 140, i.e., allowing a large thickness tolerance for the unit cells 10. Allowing a large thickness tolerance for the unit cells 10 relatively relaxes dimensional management when manufacturing the unit cells 10. This makes the production of the unit cells 10 relatively easy and improves product yields.

Although not illustrated, the Embodiment 3 is also modifiable like the Embodiments 1 and 2. For example, like the Modification 1 (FIG. 7) of the Embodiment 1 and the Modification 1 (FIG. 17) of the Embodiment 2, it is preferred to provide a stepped configuration for an upper end face 125 of the side wall part 124 of the cell case 120 to which an end of the first lid member 200 made of a single-layer metal plate is tightly attached.

Like the Modification 2 (FIG. 8) of the Embodiment 1 and the Modification 2 (FIG. 18) of the Embodiment 2, it is preferred to arrange a stopper 129 protruding in a lateral direction L on the side wall part 124 of the cell case 120, thereby preventing the movement of the laminated body 140 in the lateral direction L.

Like the Modification 8 (FIG. 14) of the Embodiment 1 and the Modification 3 (FIG. 19) of the Embodiment 2, it is possible to apply a pressure based on a differential pressure between atmospheric pressure and an internal pressure of the cell case 120 to a bottom face (second face) 144 of the laminated body 140.

In this case, the main body unit 110 further includes a second lid member and a second cover plate 177 (refer to FIGS. 14 and 19). Like the first lid member 200, the second lid member is made of a single-layer metal plate. The second lid member elastically deforms when the internal pressure of the cell case 120 is lower than the external pressure of the cell case 120, comes into contact with the bottom face (second face) 144 of the laminated body 140, and applies a pressure based on the differential pressure thereto.

As explained above, the Embodiment 3 employs the first lid member of simple structure made of a single-layer metal plate to apply a pressure based on a differential pressure between an external pressure (atmospheric pressure) and an internal pressure of the cell case to the first face of the laminated body in which the unit cells are laminated one on another. Without enlarging, for example, the decompressor (pressure applying device) that decompresses the inside of the cell case to decrease the internal pressure of the cell case lower than the external pressure, a total pressing pressure will increase as a unit cell (electrode) area increases. Accordingly, the Embodiment 3 is also able to provide a battery pack that is capable of easily applying a proper pressing pressure, even if the area of each electrode is large, to the laminated body in which the unit cells are laminated one on another.

With the unit cells being seen in a plan view in terms of the laminated direction, the first lid member comes into contact with, in an area larger than the part of the laminated unit cells that contributes to power generation, the first face of the laminated body. This configuration is able to uniformly pressurize the whole of the power generation contributing part and suppress an occurrence of local deterioration of the unit cells.

The unit cells are provided with the seal part for sealing the peripheries of the unit cells and the part of the unit cells contributing to power generation is inside the seal part. The first lid member is in contact with, in at least a part of the seal part and in the power generation contributing part, the first face of the laminated body. This configuration with the unit cells having the seal part is able to uniformly pressurize the whole of the power generation contributing part and prevent an occurrence of local deterioration of the unit cells.

As clearly illustrated in FIGS. 3 and 15 of the Embodiments 1 and 2, the first lid members 170 and 180 are in contact with the first face 142 from an end of the laminated body 140. With the unit cells being seen in a plan view in terms of the laminated direction, the first lid members 170 and 180 of the Embodiments 1 and 2 are in contact with, in an area larger than a part of the laminated unit cells that contributes to power generation, the first face 142 of the laminated body 140. Accordingly, the Embodiments 1 and 2 are also able to uniformly pressurize the whole of the power generation contributing part and suppress an occurrence of local deterioration of the unit cells.

Selecting the material and thickness of the first lid member will be explained.

When selecting the material and thickness of the first lid member, it is necessary to consider that a pressure leakage is small and that a vacuum keeping characteristic is excellent. Further, as explained above, it is necessary to consider that the first lid member satisfies the uniform pressurization characteristic to uniformly pressurize the part corresponding to the power generation area and allows to set a large stroke.

A test conducted to select the material and thickness of the first lid member will be explained.

Figure 22:
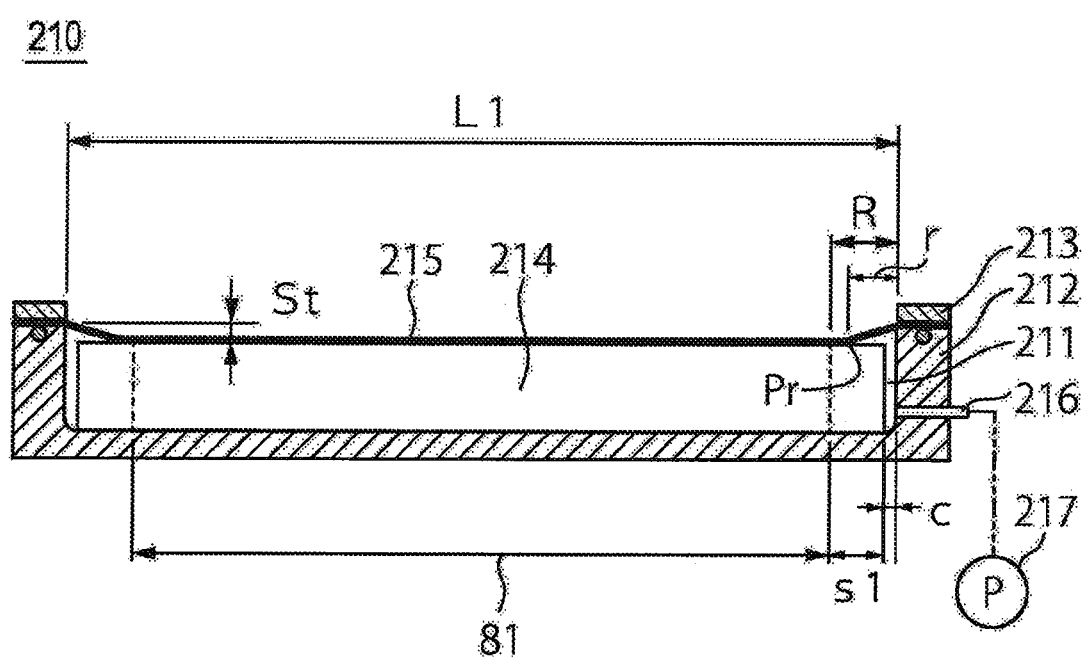
FIG. 22 is a schematic view illustrating a testing device for selecting the material and thickness of a first lid member.

FIG. 22 is a schematic view illustrating a testing device used to select the material and thickness of the first lid member.

The testing device 210 has a box-shaped lower case 212 having an accommodation space 211, a frame-shaped upper case 213 fixed to an upper part of the lower case 212, and a plate body 214 accommodated in the accommodation space 211. The periphery of a test piece 215 for the first lid member is held and fixed between the lower case 212 and the upper case 213. Airtightly attached to a side wall of the lower case 212 is a discharge connector 216. The discharge connector 216 is connected to a vacuum pump 217. The vacuum pump 217 discharges air from the inside of the lower case 212, thereby decompressing the inside of the lower case 212. The lower case 212 is a model of the cell case 120 and the dimensions (a length dimension L1 in a left-right direction in the drawing and a width dimension in a direction orthogonal to the drawing) of the accommodation space 211 are equal to the dimensions of the cell case 120. The length and width of the plate body 214 are equal to the dimensions of the laminated body 140. The plate body 214 is formed by laminating a plurality of acrylic plates one on another. By changing the number of the laminated acrylic plates, the height dimension of the plate body 214 can be changed. The height of the plate body 214 may be lowered by a predetermined dimension from a height equal to the height of the lower case 212. Namely, changing the number of the laminated acrylic plates may set a displacement, i.e., a stroke of the test piece 215 at the time of decompression. The stroke can be set from 0.5 mm to 10 mm at a pitch of 0.5 mm.

In FIG. 22, a reference mark c corresponds to a clearance between the inner face of the cell case 120 and the side wall of the laminated body 140 and is set to 5 mm. A reference mark s1 corresponds to the length of the seal part 80 from the side face of the laminated body 140, i.e., the length of the part of the laminated unit cells 10 that has no contribution to power generation and is set to 10 mm. A reference mark R is "R=c+s" corresponding to the length from the inner face of the cell case 120 to a position where the power generation area 81 starts and is set to R=15 mm. A reference mark St indicates a displacement of the test piece 215 at the time of decompression, i.e., the stroke. A reference mark Pr indicates a location where the test piece 215 starts to come into contact with a top face of the plate body 214. A reference mark r indicates a horizontal length from the inner side face of the lower case 212 up to Pr.

As illustrated in Table 1, prepared as the test piece 215 for the first lid member are a test piece 215 made of a single-layer metal plate (refer to FIG. 20A of the Embodiment 3) and a test piece 215 made of an elastic film having a multilayer structure (refer to FIG. 10 of the Modification 4 of the Embodiment 1).

More precisely, prepared as the test piece 215 made of a single-layer metal plate are a test piece 215 made of stainless steel (SUS304) having a tensile strength of 520 N/mm$^2$ and a thickness of 0.3 mm and test pieces 215 made of an aluminum material (A1050-H24) having a tensile strength of 110 N/mm$^2$ and thicknesses of 0.1 mm, 0.15 mm, and 0.2 mm, respectively.

Prepared as the test piece 215 made of an elastic film having a multilayer structure is a laminated material having a base material on each of which an elastic layer is arranged. The base material is an aluminum material having a tensile strength of 110 N/mm$^2$ and the elastic layer is made of PET, nylon, and PP material. As the test piece 215, the laminated material as a whole has a tensile strength of 70 N/mm$^2$ and a thickness of 0.18 mm.

As explained above, suppressing a local deterioration of the unit cells 10 requires that, within the range of the reference mark R of FIG. 22 (the length from the inner face of the cell case 120 up to the position where the power generation area 81 starts), the first lid member must come into contact with the first face 142 of the laminated body 140. To allow a larger tolerance for the thickness dimension of the unit cells 10, a maximum value of the stroke is preferred to be large subject to satisfying the uniform pressurization characteristic.

Under the conditions to satisfy the vacuum keeping characteristic and uniform pressurization characteristic of the test pieces 215, maximum stroke values have been tested as mentioned below.

The plate body 214 with a stroke of 0.5 mm is accommodated in the lower case 212, the test piece 215 is fixed, and the inside of the lower case 212 is decompressed up to −90 kPa Gauge. This state is maintained for five minutes and a pressure leakage (kPa/min) is measured. The horizontal length r from the inner side face of the lower case 212 up to Pr is measured with a scale. In connection with an area in which the test piece 215 is in contact with the top face of the plate body 214, it is confirmed that the test piece 215 is in contact with the top face of the plate body 214.

If the pressure leakage is lower than a threshold value of 0.06 kPa/min, the vacuum keeping characteristic is determined to be "OK". If it is equal to or greater than the threshold value, it is determined that a leak has occurred and the vacuum keeping characteristic is determined to be "NG". If the measured horizontal length r is equal to or smaller than R (=15 mm), the uniform pressurization characteristic is determined to be "OK". If the measured horizontal length r is over R (=15 mm), the uniform pressurization characteristic is determined to be "NG".

If the vacuum keeping characteristic or the uniform pressurization characteristic is "OK", the inside of the lower case 212 is opened to the atmosphere, the plate body 214 with a stroke of 1 mm (an increase of 0.5 mm) is accommodated in the lower case 212, the test piece 215 is fixed, and the inside of the lower case 212 is decompressed up to −90 kPa Gauge. This state is maintained for five minutes and whether or not the vacuum keeping characteristic is good is tested according to the above-mentioned threshold value. The horizontal length r is measured with a scale, and according to the above-mentioned value of R, whether or not the uniform pressurization characteristic is good is determined.

Until the vacuum keeping characteristic becomes "NG", the stroke is increased by 0.5 mm each time to repeat the vacuum keeping characteristic test. At the same time, the uniform pressurization characteristic test is repeated until the uniform pressurization characteristic becomes "NG". In the Table 1, the strokes when the vacuum keeping characteristic becomes "NG" are written. Also in the Table 1, the maximum stroke values that satisfy the uniform pressurization characteristic are written.

TABLE 1

| | Material | Thick [mm] | Vacuum keeping (Leak St [mm]) | Uniform pressing "OK" max St [mm] | Tensile strength [N · mm$^2$] | Result |
|---|---|---|---|---|---|---|
| Cmp. 1 | Stainless steel (SUS304) | 0.3 | No leak up to St = 10 mm | 1 | 520 | x |
| Cmp. 2 | Al (A1050-H24) | 0.1 | 6 | 3 | 110 | x |
| Emb. 1 | Al (A1050-H24) | 0.15 | 8 | 2.5 | 110 | o |
| Emb. 2 | Al (A1050-H24) | 0.2 | 8 | 2 | 110 | o |
| Emb. 3 | Laminated Al | 0.18 | No leak up to St = 10 mm | 4 | 70 | o |

As product requirements, for example, the vacuum keeping characteristic must be "OK" at a stroke of at least 6 mm and the maximum stroke value under the condition of satisfying the uniform pressurization characteristic must "exceed 1 mm".

If the maximum stroke value exceeds 1 mm, a tolerance allowed for the thickness dimension of the unit cells 10 becomes larger to make the production of the unit cells relatively easy and contribute to improving product yields. On the other hand, if the maximum stroke value is equal to or lower than 1 mm, the tolerance allowed for the thickness dimension of the unit cells 10 is too small so that the production easiness of the unit cells 10 and the product yield improvement will not be achieved. If the stroke is at least 6 mm and the vacuum keeping characteristic is "OK", airtightness will be maintained for a relatively long period. If the stroke is 6 mm and the vacuum keeping characteristic is "NG", it is not preferable because the frequency of decompressing operation will increase.

In the result column of the Table 1, "o" indicates that each of the maximum stroke values satisfying the conditions of the vacuum keeping characteristic and uniform pressurization characteristic satisfies the product requirements. "x" in the result column indicates that at least one of the maximum stroke values satisfying the conditions of the vacuum keeping characteristic and uniform pressurization characteristic does not satisfy the product requirements.

When forming the first lid member from a single-layer metal plate (refer to FIG. 20A of the Embodiment 3), it is understood from the results illustrated in the Table 1 that an aluminum material (A1050-H24) having a tensile strength of 110 N/mm$^2$ and a thickness of 0.15 mm to 0.2 mm is selectable.

The first lid member made of the above-mentioned single-layer metal plate demonstrates, first of all, little pressure leakage, i.e., an excellent vacuum keeping characteristic to keep a differential pressure. With this, an elastic deformation of the first lid member due to the differential pressure between an external pressure and an internal pressure of the cell case can stably be maintained. Further, it is possible to extend the stroke that satisfies the uniform pressurization characteristic. This results in increasing a tolerance allowed for the thickness of the unit cells 10 and relatively relaxing dimensional management when manufacturing the unit cells 10. As a result, the manufacturing becomes relatively easy and product yields improve.

When forming the first lid member from an elastic film having a multilayer structure (refer to FIG. 10 of the Modification 4 of the Embodiment 1), it is understood that the elastic film is selectable from a laminated material that has an elastic layer arranged on each face of a base material and has a tensile strength of 70 N/mm$^2$ and a thickness of 0.18 mm.

The first lid member made from the above-mentioned laminated material is capable of, like the one mentioned above, stably maintaining an elastic deformation of the first lid member due to a differential pressure between an external pressure and an internal pressure of the cell case. In addition, it increases a tolerance allowed for the thickness dimension of the unit cells 10, makes the manufacturing thereof relatively easy, and contributes to improving the product yields.

As explained above, it is preferred that the first lid member, in a state deformed by at least 1 mm in terms of the laminated direction from a state in which an internal pressure of the cell case is equal to an external pressure of the cell case, is in contact with the first face of the laminated body. With this configuration, the first lid member satisfies the condition of uniformly pressurizing the whole of an area corresponding to the power generation area 81, and at the same time, is able to increase a displacement (stroke) along the laminated direction of the unit cells 10. With this, a tolerance allowed for the thickness dimension of the unit cells 10 becomes larger and dimensional management when manufacturing the unit cells 10 is relatively relaxed. As a result, the manufacturing becomes relatively easy and product yields improve.

It is preferable that the first lid member has a tensile strength of 70 to 110 N/mm$^2$ and a thickness of 0.15 to 0.2 mm. The first lid member having such a constitution demonstrates little pressure leakage and an excellent vacuum keeping characteristic to maintain a differential pressure. As a result, the differential pressure between an external pressure and an internal pressure of the cell case can stably maintain an elastic deformation of the first lid member. In addition, the condition of uniformly pressurizing the whole of an area corresponding to the power generation area 81 is satisfied and a displacement (stroke) along the laminated direction of the unit cells 10 can be increased. This results in increasing a tolerance allowed for the thickness dimension of the unit cells 10 and relatively relaxing dimension management when manufacturing the unit cells 10. As a result, the manufacturing becomes relatively easy and product yields improve.

Embodiment 4 will be explained.

Figure 23:
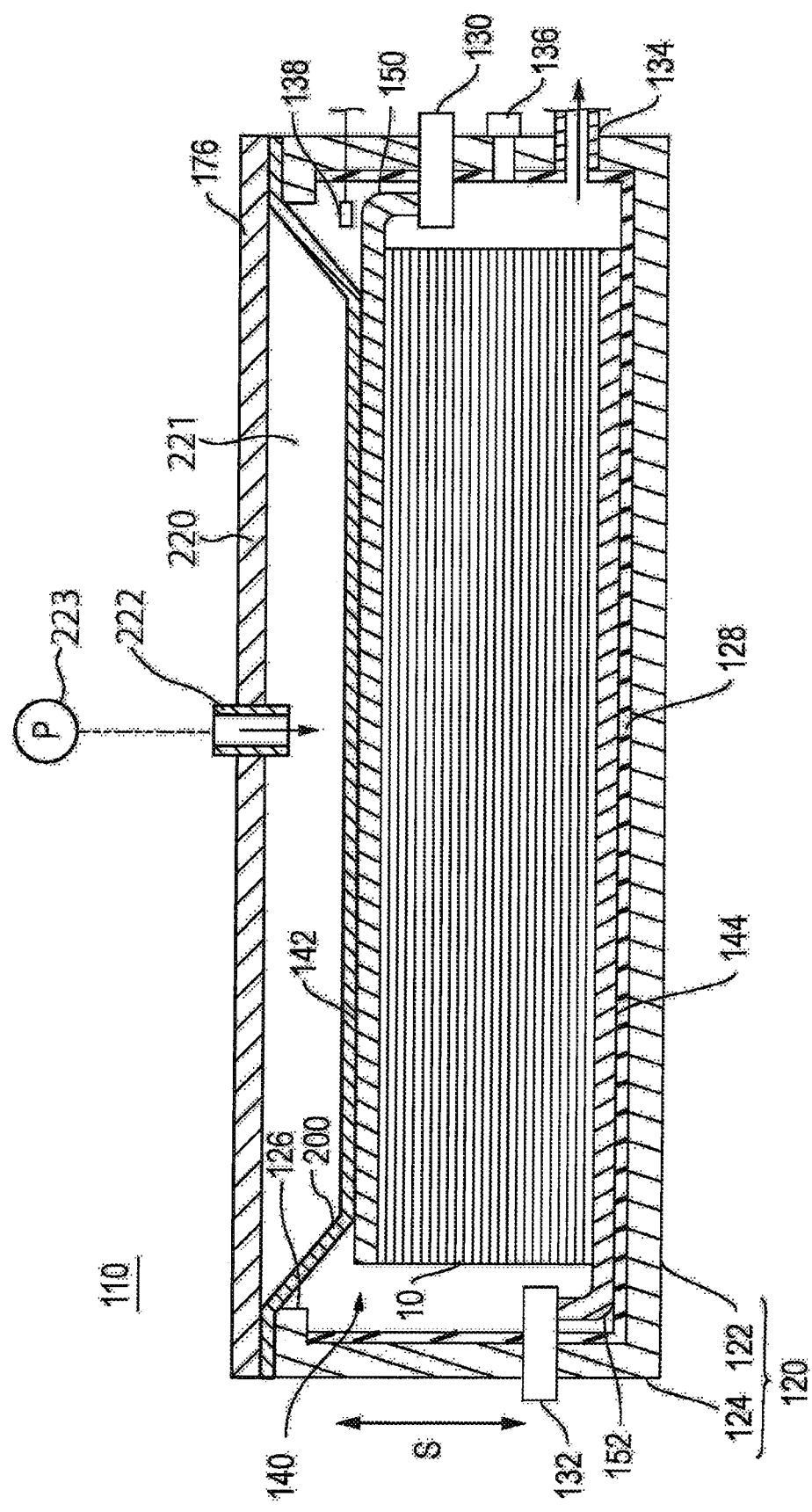
FIG. 23 is a sectional view illustrating a battery pack according to Embodiment 4.

FIG. 23 is a sectional view illustrating a battery pack according to the Embodiment 4. In FIG. 23, a first lid member is in a deformed state due to a differential pressure.

The present invention is not limited to the configuration that applies, to the laminated body 140, a pressure based on a differential pressure between atmospheric pressure serving as an external pressure and an internal pressure of the cell case 120. It is possible to apply, to the laminated body 140, a pressure based on a differential pressure between an external pressure higher than atmospheric pressure and an internal pressure of the cell case 120.

In this case, instead of the first cover plate, a sealing plate 220 is arranged to cover the first lid member 200. The sealing plate 220 is made of light material such as aluminum having a good rigidity. The sealing plate 220 and first lid member 200 are fixed to a cell case 120 with the use of fastening members such as screws. The fastening members may also be used as fastening members to install the battery pack 100 in the vehicle 198. The Embodiment 4 except the sealing plate 220 is substantially the same as the Embodiment 3, and therefore, explanations of the other configurations thereof will be omitted.

A space 221 between the sealing plate 220 and the first lid member 200 is tightly closed. The sealing plate 220 is airtightly provided with an air supply connector 222. The air supply connector 222 is connected to a pump 223 that supplies air whose pressure is higher than atmospheric pressure. When the pump 223 supplies the air into the space 221 between the sealing plate 220 and the first lid member 200, the first lid member 200 receives the external pressure that is higher than atmospheric pressure. As a result, the first lid member 200 is able to apply a pressure based on a differential pressure between the external pressure higher than atmospheric pressure and an internal pressure of the cell case 120 to the laminated body 140.

Although not illustrated, like the Modification 8 (FIG. 14) of the Embodiment 1 and the Modification 3 (FIG. 19) of the Embodiment 2, it is possible to apply the pressure based on the differential pressure between the external pressure higher than atmospheric pressure and the internal pressure of the cell case 120 to a bottom face (second face) 144 of the laminated body 140.

In this case, the main body unit 110 further includes a second lid member and a sealing plate 220. The second lid member is made of, like the first lid member 200, a single-layer metal plate. Into a space between the sealing plate 220 and the second lid member, the pump 223 supplies air to apply the external pressure higher than atmospheric pressure to the second lid member. As a result, the second lid member elastically deforms due to the differential pressure between the external pressure higher than atmospheric pressure and the internal pressure of the cell case 120 and comes into contact with the bottom face (second face) 144 of the laminated body 140, thereby applying thereto the pressure based on the differential pressure.

As mentioned above, the Embodiment 4 supplies air having an external pressure higher than atmospheric pressure, to decrease the internal pressure of the cell case (decreases the internal pressure of the cell case lower than atmospheric pressure), so that a pressure based on a differential pressure between the external pressure higher than atmospheric pressure and the internal pressure of the cell case is applied by the first lid member deformed in a tightly closed state to the first face of the laminated body in which the unit cells are laminated one on another. Namely, the pressing force to the laminated body in which the unit cells are laminated one on another is formed from the pressure based on the differential pressure, and when a unit cell (electrode) area increases, a total pressing pressure increases. Even if the area of each electrode is large, it is possible to provide a battery pack that is able to easily apply an appropriate pressing pressure to the laminated body in which the unit cells are laminated one on another.

The present invention is not limited to the above-mentioned embodiments and is variously modifiable within the scope of claims. For example, the Modifications 1 to 8 according to the Embodiment 1 may properly be combined and applied to the Embodiment 1 and the Modifications 1 to 3 of the Embodiment 2 and the Modifications 3 to 7 of the Embodiment 1 may properly be combined and applied to the Embodiment 2. Also, the Embodiments 1 to 4 and the Modifications of the Embodiments 1 to 4 may properly be combined to form other embodiments.

This application is based on Japanese Patent Application No. 2016-47609 filed on Mar. 10, 2016 and Japanese Patent Application No. 2017-43578 filed on Mar. 8, 2017 and the disclosed contents thereof are referred to and entirely incorporated herein.

DESCRIPTION OF REFERENCE NUMERALS

10: Unit cell
20: Positive electrode collector layer
30: Positive electrode layer
32: Positive electrode active material particle
33: Coating layer
34: Coating resin
35: Conductive adjuvant
38: Fibrous material
40: Separator
50: Negative electrode layer
52: Negative electrode active material particle
53: Coating layer
54: Coating resin
55: Conductive adjuvant
58: Fibrous material 60: Negative electrode active material particle
70: Conductive layer
80: Seal section
81: Power generation area (Part of laminated unit cells that contributes to power generation)
100: Battery pack
110: Main body unit
120: Cell case
122: Bottom face
124: Side wall part
125: Upper end face
126, 127: Opening
128: Insulating film layer
129: Stopper
130, 132: High-voltage connector
134: Discharge connector
136: Pressure release valve
138: Pressure sensor
140: Laminated body
141A, 141B: Block
142: Top face (First face)
144: Bottom face (Second face)
146: Elastic member
150, 152: High-voltage tab
153: Elastic layer
153A: Conductive cloth
153B: Conductive urethane foam
153C: Conductive nonwoven cloth
154: Support layer
160, 162: Spacer
170: First lid member
171: Elastic film
172: Metal layer
173: Second lid member
176: First cover plate
178: Opening
177: Second cover plate
179: Opening
180: First lid member
181: Plate-like part
182: Freely expandable/contractible part
183: Second lid member
184: Plate-like part
185: Freely expandable/contractible part
190: Decompressor
194: Control unit
198: Vehicle
200: First lid member
210: Testing device
211: Accommodation space
212: Lower case
213: Upper case
214: Plate body
215: Test piece for first lid member
216: Discharge connector
217: Vacuum pump
220: Sealing plate
221: Space
222: Air supplying connector
223: Pump
L: Lateral direction
S: Laminated direction

The invention claimed is:
1. A battery pack comprising:
a laminated body in which unit cells are laminated one on another and each of the unit cells are sealed;
a cell case made of a rigid material, having a cell case volume and a first opening, and containing the laminated body; and
a first lid member made of a flexible material and tightly closing the first opening,
wherein the first opening is positioned to face a first face of the laminated body in connection with a laminated direction of the unit cells, and
wherein the first lid member is configured to:
be deformable while tightly closing the first opening when the cell case volume is decompressed;
be positioned away from the first face of the laminated body when an internal pressure of the cell case is equal to an external pressure of the cell case; and
when the internal pressure of the cell case is lower than the external pressure of the cell case due to the cell case volume being in a state of decompression, deform, come into contact with the first face of the laminated body, and apply a pressure based on a differential pressure between the internal pressure of the cell case and the external pressure of the cell case to the contacting face, wherein:
the cell case of the battery pack is set and maintained in a condition where the internal pressure of the cell case is lower than the external pressure, and the first lid member is maintained in contact with the first face of the laminated body; and
the external pressure of the cell case is equal to the atmospheric pressure or more,
wherein the first lid member is made of a material having a tensile strength of 70 N/mm$^2$ to 110 N/mm$^2$ and a thickness of 0.15 mm to 0.2 mm, wherein the flexible material of first lid member is different than the rigid material of the cell case, and
wherein the first lid member is thinner than walls of the cell case.

2. The battery pack as set forth in claim 1, further comprising a second lid member made of a flexible material, wherein:
the cell case has a second opening;
the second lid member tightly closes the second opening;
the second opening is positioned to face a second face of the laminated body in connection with the laminated direction of the unit cells; and
the second lid member is configured to:
be deformable while tightly closing the second opening when the cell case volume is decompressed;
be positioned away from the second face of the laminated body when an internal pressure of the cell case is equal to an external pressure of the cell case; and
when the internal pressure of the cell case is lower than the external pressure of the cell case due to the cell case volume being in a state of decompression, deform, come into contact with the second face of the laminated body, and apply a pressure based on a differential pressure between the internal pressure of the cell case and the external pressure of the cell case to the contacting face.

3. The battery pack according to claim 1, wherein the first lid member, in a state in which the unit cells are seen in a plan view and in an area larger than a part of the laminated unit cells that contributes to power generation, comes into contact with the first face of the laminated body.

4. The battery pack according to claim 3, wherein:
the unit cells include a seal part that seals the peripheries of the unit cells, an inner side of the seal part being the power generation contributing area; and the first lid member, in at least a part of the seal part and in the power generation contributing area, comes into contact with the first face of the laminated body.

5. The battery pack according to claim 1, wherein the first lid member, when a state in which an internal pressure of the cell case is equal to an external pressure of the cell case changes to a state of decompression in which the first lid member is deformed by at least 1 mm or greater in terms of the laminated direction, comes into contact with the first face of the laminated body.

6. The battery pack according to claim 1, wherein the first lid member is made of an elastic film, and when an internal pressure of the cell case is lower than an external pressure of the cell case, elastically deforms to come into contact with the first face of the laminated body and apply the pressure based on the differential pressure to the contacting face.

7. The battery pack according to claim 6, wherein the elastic film has a multilayer structure and includes a metal layer on the surface or inside of the elastic film.

8. The battery pack according to claim 1, wherein:
the first lid member has a plate-like part shaped to substantially agree with the first face of the laminated body and a freely expandable and contractible part surrounding the periphery of the plate-like part; and
the freely expandable and contractible part expands when an internal pressure of the cell case is lower than an external pressure of the cell case, so that the plate-like part comes into contact with the first face of the laminated body and applies a pressure based on the differential pressure to the contacting face.

9. The battery pack according to claim 8, wherein the freely expandable and contractible part has a bellows structure.

10. The battery pack according to claim 1, further comprising a stopper to stop movement of the laminated body in connection with a lateral direction orthogonal to the laminated direction.

11. The battery pack according to claim 1, comprising:
a pressure sensor to measure an internal pressure of the cell case; and
a decompressor configured to, when the internal pressure measured by the pressure sensor is equal to or greater than an upper limit value, decompress the inside of the cell case, wherein the upper limit value is set in consideration of the differential pressure.

12. The battery pack according to claim 11, wherein the upper limit value is set to 0.25 atmospheres.

13. The battery pack according to claim 11, wherein:
the decompressor is configured to, when the internal pressure measured by the pressure sensor reaches a lower limit value, stop decompressing the inside of the cell case; and
the lower limit value is set to 0.15 atmospheres.

14. The battery pack according to claim 1, further comprising a plate-like high-voltage tab to take a current out of the laminated unit cells, wherein:
the high-voltage tab has a two-layer structure including an elastic layer and a support layer arranged on a first face of the elastic layer;
a second face of the elastic layer is positioned to face the unit cells and has elasticity to deform according to a surface shape of the unit cells; and
the strength and rigidity of the support layer are greater than the strength and rigidity of the elastic layer.

15. The battery pack according to claim 1, further comprising a pressure release valve to decrease the internal pressure of the cell case.

16. The battery pack according to claim 1, wherein:
the laminated body is divided into a plurality of blocks in connection with the laminated direction; and
between adjacent ones of the blocks, there is arranged a plate-like elastic member having elasticity to deform according to surface shapes of the blocks.

17. The battery pack according to claim 1, wherein:
the unit cells each sequentially include a positive electrode collector layer, a positive electrode layer, a separator, a negative electrode layer, and a negative electrode collector layer;
the thickness of the positive electrode layer and the thickness of the negative electrode layer each are 150 μm or greater;
the positive electrode layer contains positive electrode active material particles and fibrous material;
the negative electrode layer contains negative electrode active material particles and fibrous material; and
the surfaces of the positive electrode active material particles and/or the surfaces of the negative electrode active material particles at least partly have a coating layer made of conductive adjuvant and coating resin.

18. The battery pack according to claim 17, further comprising a conductive layer arranged between adjacent ones of the unit cells.

19. The battery pack according to claim 1, wherein a periphery of each of the unit cells is sealed.

20. The battery pack according to claim further comprising a first cover plate arranged for covering and guarding the first lid member.

21. A vehicle comprising the battery pack according to claim 1 as a power source.

* * * * *